US012253178B2

(12) United States Patent
Hess et al.

(10) Patent No.: US 12,253,178 B2
(45) Date of Patent: Mar. 18, 2025

(54) INDEXING VALVE FOR REGENERATIVE THERMAL OXIDIZER

(71) Applicant: PROCESS COMBUSTION CORPORATION, Pittsburgh, PA (US)

(72) Inventors: Nathan Hess, Pittsburgh, PA (US); Jordan Lowe, Pittsburgh, PA (US); Jordan Weichel, Glenshaw, PA (US); Shaun Mehr, Pittsburgh, PA (US)

(73) Assignee: Process Combustion Corporation, Pittsburgh, PA (US)

( * ) Notice: Subject to any disclaimer, the term of this patent is extended or adjusted under 35 U.S.C. 154(b) by 182 days.

(21) Appl. No.: 18/067,279

(22) Filed: Dec. 16, 2022

(65) Prior Publication Data

US 2023/0194004 A1 Jun. 22, 2023

Related U.S. Application Data

(60) Provisional application No. 63/265,582, filed on Dec. 17, 2021.

(51) Int. Cl.
*F16K 11/052* (2006.01)
*F16K 31/04* (2006.01)
*F16K 31/53* (2006.01)
*F23G 7/06* (2006.01)

(52) U.S. Cl.
CPC .......... *F16K 11/052* (2013.01); *F16K 31/043* (2013.01); *F16K 31/535* (2013.01); *F23G 7/068* (2013.01); *Y10T 137/5544* (2015.04); *Y10T 137/5689* (2015.04)

(58) Field of Classification Search
CPC .... F16K 25/02; F16K 11/074; F16K 11/0746; F16K 11/076; F16K 11/0525; F16K 11/052; F16K 31/043; F16K 31/535; Y10T 137/4259; Y10T 137/5544; Y10T 137/5689; Y02E 20/34; F23G 2207/101;
(Continued)

(56) References Cited

U.S. PATENT DOCUMENTS

| 704,654 | A | * | 7/1902 | Moffitt et al. | ........... | F23L 15/02 137/340 |
| 956,538 | A | * | 5/1910 | Mitchell | ................. | F23L 15/02 137/310 |

(Continued)

*Primary Examiner* — Craig J Price
(74) *Attorney, Agent, or Firm* — McNees Wallace & Nurick

(57) ABSTRACT

An indexing valve for a regenerative thermal oxidizer (RTO). A valve housing includes a diverter assembly further comprising: a pipe shaft, the pipe shaft disposed through the valve housing; a diverter blade subassembly connected to the pipe shaft between the pipe shaft ends for rotating within the valve housing, the rotation of which is supported by a bearing assembly at the base; the diverter blade subassembly further comprising a pair of opposing diverter plates, each of the diverter plates curved, wherein a large-volume inlet plenum is defined between the diverter plates for receiving fluid flow from one of the ports. To aid in sealing, the corner section ends within the housing extend beyond a width of each corner and are chamfered to limit wear of the seal. Fluid flow is either atmospheric pressure or negative pressure relative to said valve housing to further aid in sealing.

11 Claims, 27 Drawing Sheets

(58) Field of Classification Search
CPC ........ F23G 7/068; F28D 17/023; F28D 17/04; F23L 15/02
USPC ......... 251/175, 173, 172, 304–308; 110/214, 110/236; 137/240, 244, 246.22, 309, 311, 137/625.43, 625.44
See application file for complete search history.

(56) References Cited

U.S. PATENT DOCUMENTS

| | | | | |
|---|---|---|---|---|
| 1,102,197 | A * | 6/1914 | Knox | F16K 49/007 137/340 |
| 1,511,544 | A * | 10/1924 | Wagner | F16K 1/22 137/310 |
| 2,740,605 | A * | 4/1956 | Schwenk | G01M 9/04 251/173 |
| 2,913,218 | A * | 11/1959 | Broz | F16K 1/2285 251/173 |
| 3,045,692 | A | 8/1961 | Reynolds et al. | |
| 3,214,135 | A * | 10/1965 | Hartman | F16K 5/0689 137/246.22 |
| 3,684,239 | A * | 8/1972 | Schwartzbart | F16K 1/228 251/173 |
| 4,506,703 | A * | 3/1985 | Baron | F28G 1/125 137/625.43 |
| 4,552,334 | A * | 11/1985 | Tomiyama | F16K 11/0876 137/240 |
| 4,653,537 | A * | 3/1987 | Voith | F16K 11/0836 137/625.43 |
| 5,529,758 | A * | 6/1996 | Houston | F16K 11/0853 422/171 |
| 6,669,472 | B1 * | 12/2003 | Cash | F27D 21/02 432/179 |
| 6,776,136 | B1 * | 8/2004 | Kazempour | F01C 21/06 123/243 |
| 6,865,974 | B2 * | 3/2005 | Chang | B23Q 11/0046 83/788 |
| 7,740,026 | B2 * | 6/2010 | Matsui | F16K 3/085 110/244 |
| 11,079,107 | B1 | 8/2021 | Greco | |
| 2003/0221725 | A1 * | 12/2003 | Greco | F16K 11/0525 137/309 |
| 2014/0230919 | A1 * | 8/2014 | Rhoads | F23K 5/007 137/119.01 |

* cited by examiner

INDEXING VALVE FOR REGENERATIVE THERMAL OXIDIZER

CROSS-REFERENCE TO RELATED APPLICATIONS

The present application claims benefit of provisional application Ser. No. 63/265,582, filed Dec. 17, 2021, the contents of which are incorporated herein.

FIELD OF THE INVENTION

The present invention relates to valves for regenerative thermal oxidizers. In particular, the instant index valve increases performance, reliability, and manufacturability by implementing a negative pressure flow system, larger inlet shaft, and other features, as follows.

BACKGROUND OF THE INVENTION

Thermal oxidizers are the incinerator devices at hazardous gas-producing chemical and industrial plants, thus these thermal oxidizers make up part of the air pollution control systems. There are various types of oxidizers.

Regenerative thermal oxidizers (RTO) use heat exchangers, such as an exchange media of ceramic, to absorb heat and minimize the energy required to oxidize outgoing process gases being sent to an exhaust stack. An RTO may have two chambers and thus two heat exchangers that are separately connected to a shared combustion chamber. As such, the fluid flow can be rerouted to a second chamber periodically to minimize the auxiliary fuel required to support oxidation.

Required to change the fluid (waste gas) path into the separate media is an indexing valve which can change the position of an internally-disposed diverter plate. The diverter plate can pivot or rotate between two or more ports to divert the fluid into each chamber, then subsequently to the exhaust ports.

In U.S. Pat. No. 11,079,107 for example, a fluid flow diverter includes a diverter body having four ports, a rotating plenum located within the diverter body, and a purge fluid assembly that supplies a purge fluid and thus a positive pressure fluid barrier to the plenum to better ensure separation of the fluid streams across the plenum, within the valve housing.

Drawbacks exist in as much as fluid leakage can occur across the plenum, thereby decreasing efficiency of the RTO. Better seals can also be created by changing, not only the pressure within the diverter plate/plenum, but also by changing the shape of the plenum, and as such these and other drawbacks within RTO valves are addressed by the instant system.

SUMMARY OF THE INVENTION

It is the objective of the present invention to provide a more air-sealed indexing valve using a purge fluid system providing a negative pressure barrier across the diverter plate.

It is further an objective of the invention to increase the destruction efficiency of the RTO system.

It is further an objective to increase performance, reliability, and manufacturability.

Accordingly, comprehended is an indexing valve for an RTO, comprising: a valve housing, the valve housing having a housing top, a housing bottom, a housing interior and one or more ports; a diverter assembly within the valve housing, the diverter assembly further comprising: a pipe shaft having two pipe shaft ends, the pipe shaft disposed through the valve housing; a stub shaft connected to the pipe shaft transitioning vertically from the pipe shaft up through the housing top; a diverter blade subassembly connected to the pipe shaft between the pipe shaft ends for rotating within the valve housing, the diverter blade subassembly further comprising a pair of opposing diverter plates, each of the diverter plates curved, wherein a large-volume inlet plenum is defined between the diverter plates for receiving fluid flow from one of the ports; and, a gear motor communicating with the stub shaft for driving the diverter blade subassembly within the valve housing to thereby divert the fluid flow to another of the ports. A top motor mount is attached to the housing top, the top motor mount residing on a roof plate of the housing top, the top motor mount formed by a rigid top beam extending from the housing top. A bottom bearing mount is attached to the housing bottom, the bottom bearing mount formed by a rigid bottom beam extending from a floor plate of the housing bottom, the rigid bottom beam terminating to form a base for securing the indexing valve and which also houses a bearing assembly to help support the pipe shaft.

The valve housing, preferably having four ports and four corners, includes curved corner sections, each curved corner section formed within the valve housing between each of the ports. To aid in sealing, the corner section ends extend beyond a width of each corner to thereby extend into at least one of the ports. In addition, for sealing, a seal retainer subassembly at each of the end edges of the diverter plates includes a seal, the seal positioned to seal against the curved corner plate. Note the corner section ends are chamfered to limit wear of the seal, and the seal retainer subassembly is S-shaped formed of an elongate brace, the elongate brace transitioning to an upstanding retainer lip overhanging the elongate brace, thereby defining a robust seal housing for the seal.

For the system, i.e. a regenerative thermal oxidizer, included is the combustion chamber; heat exchangers in flow communication with the combustion chamber; a valve housing in flow communication with the heat exchangers, the valve housing further comprising a diverter blade subassembly within the valve housing, the diverter blade subassembly further comprising a pair of opposing diverter plates, wherein an inlet plenum is defined between the diverter plates for receiving fluid flow from an input port; and, a fluid flow means in communication with the input port for providing the fluid flow, wherein, as opposed to positive pressure, the fluid flow is either atmospheric pressure or negative pressure relative to the valve housing.

Other features and advantages of the present invention will be apparent from the following more detailed description, taken in conjunction with the accompanying drawings which illustrate, by way of example, the principles of the invention.

Wherever possible, the same reference numbers will be used throughout the drawings to represent the same parts. However, the prior art FIGS. 1-3 include their own, prior set of reference numbers mirroring their own filing matter, which may be duplicative of the instant invention FIGS. 4-24 which stand alone.

DETAILED DESCRIPTION OF THE INVENTION

Figure 1:
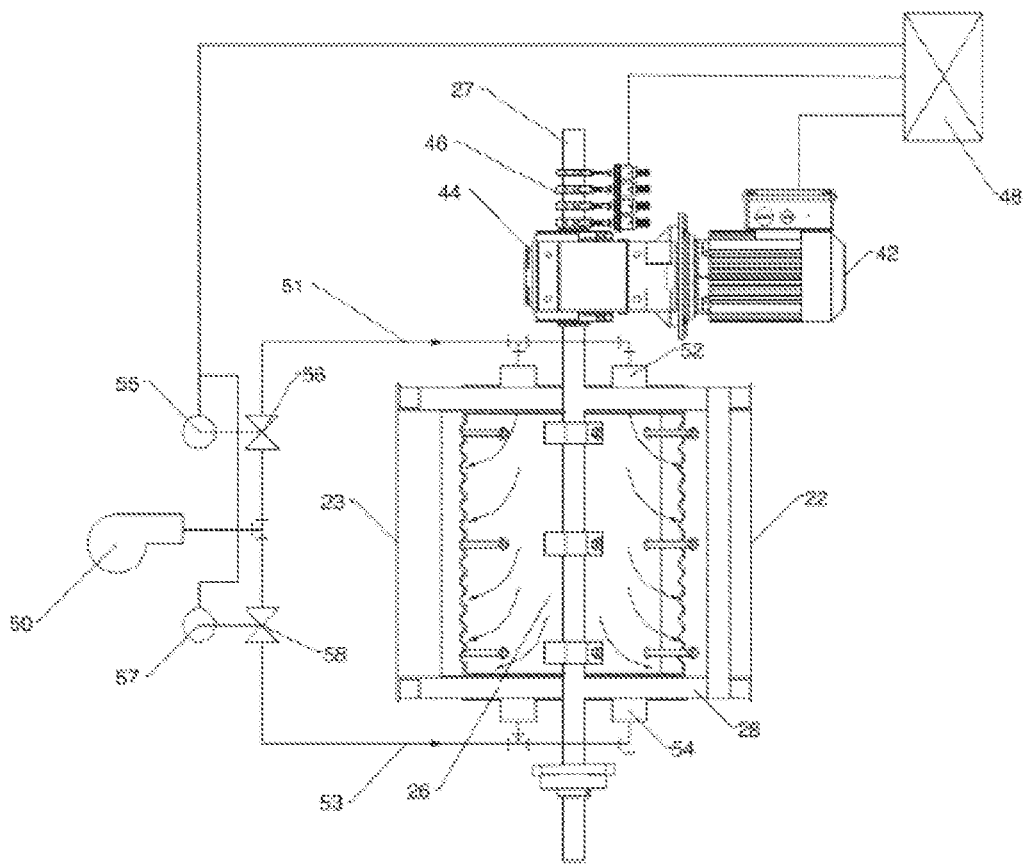
FIGS. 1-3 show a prior art fluid flow diverter.
Figure 2:
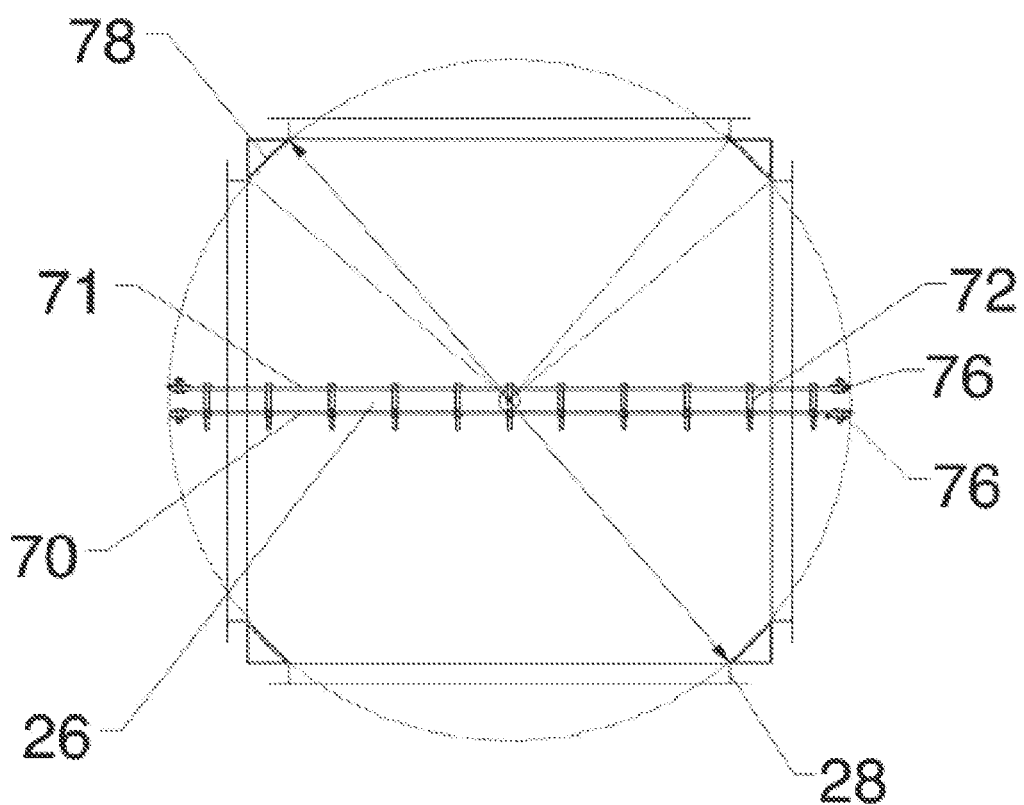
Figure 3:
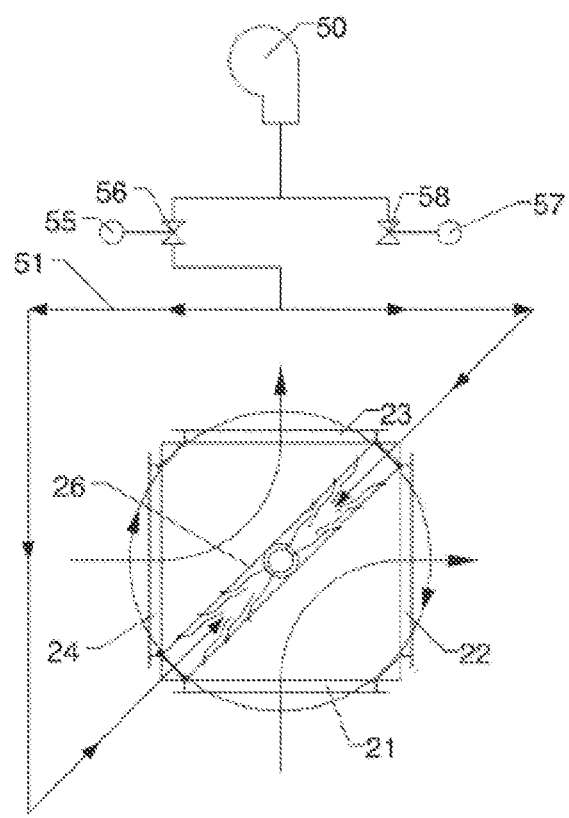
Figure 4:
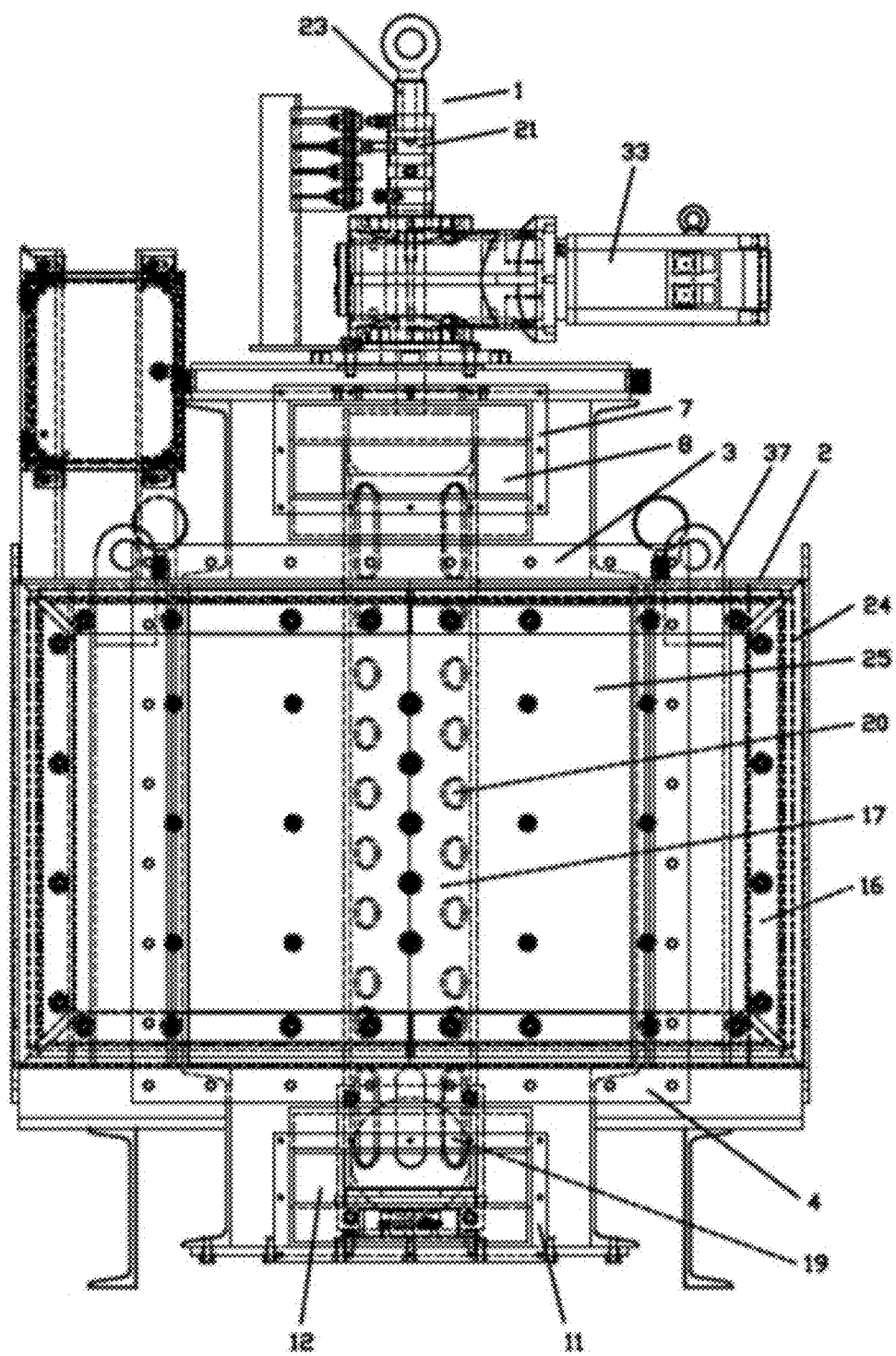
FIG. 4 shows a front view in elevation of the entire indexing valve.
Figure 4A:
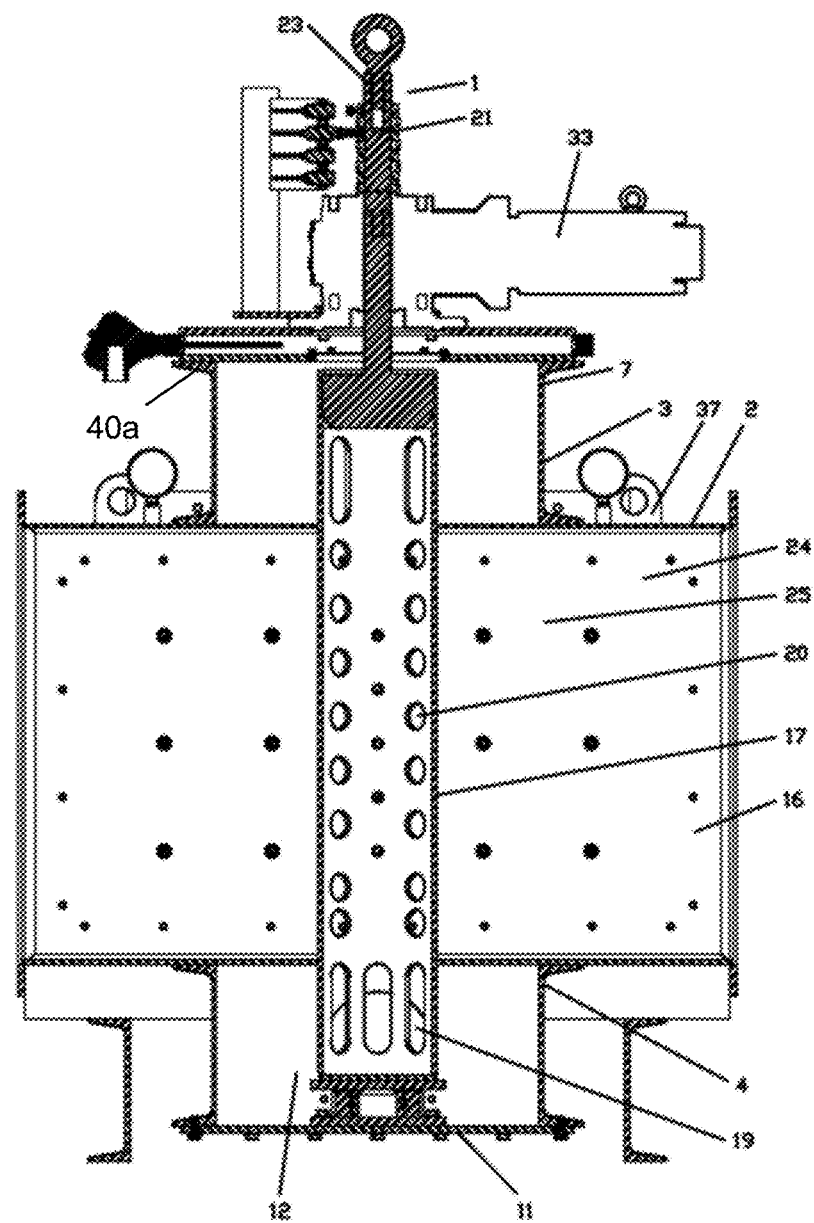
FIG. 4a shows a front view of the indexing valve in cross-section through a vertical plane.
Figure 5:
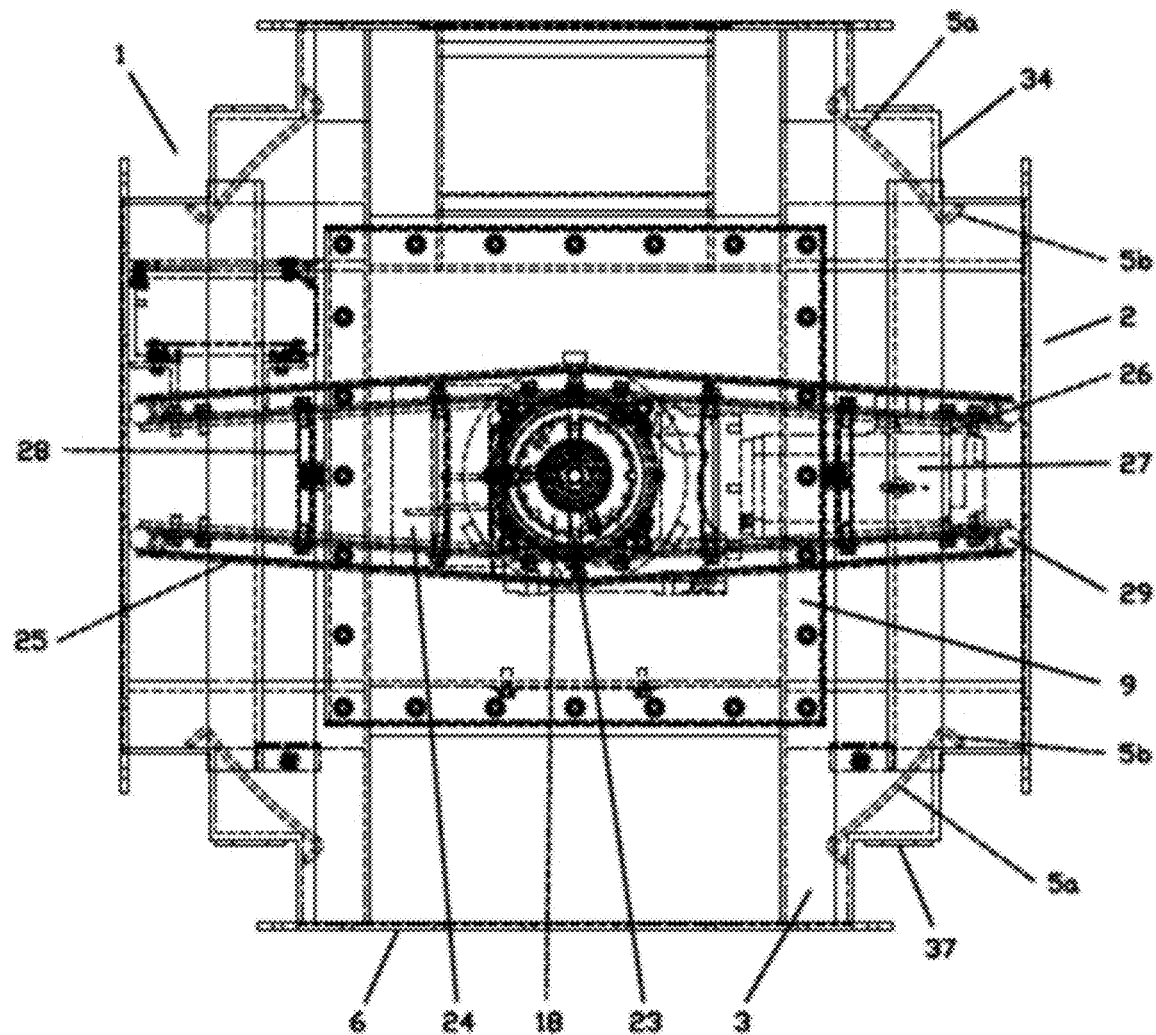
FIG. 5 shows a top view thereof in elevation.
Figure 6:
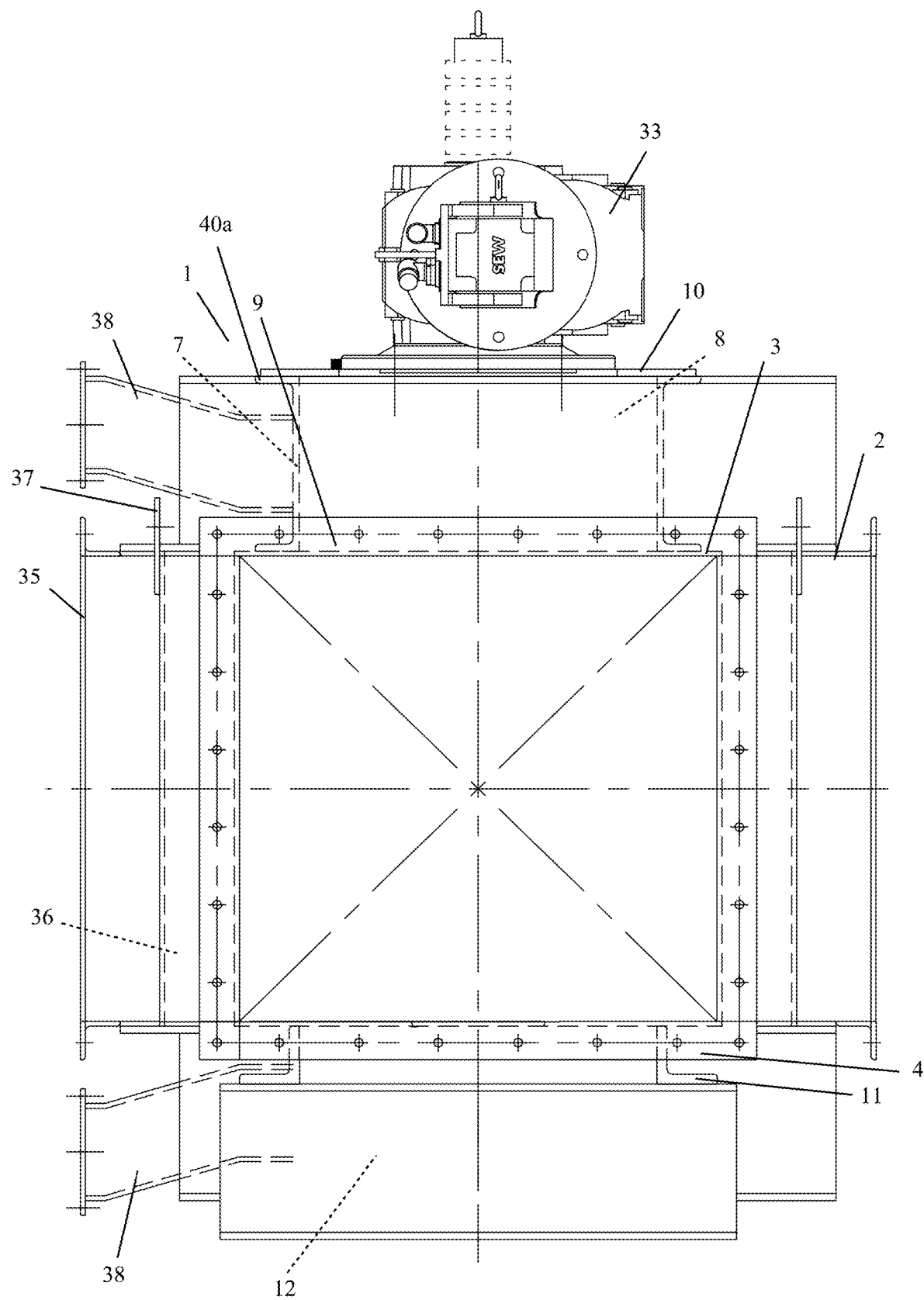
FIG. 6 shows a right side view thereof.
Figure 7:
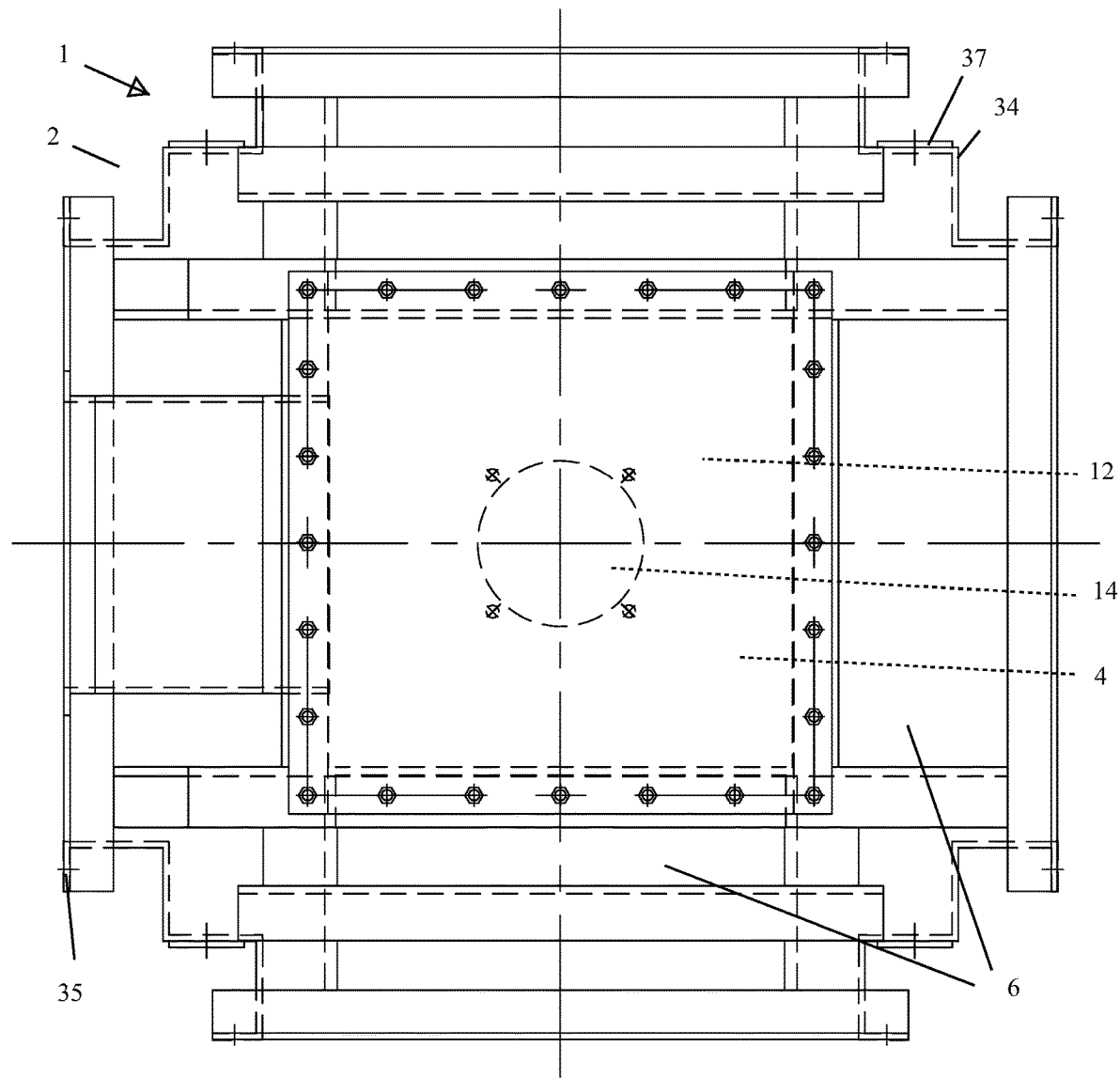
FIG. 7 shows a bottom view thereof.
Figure 8:
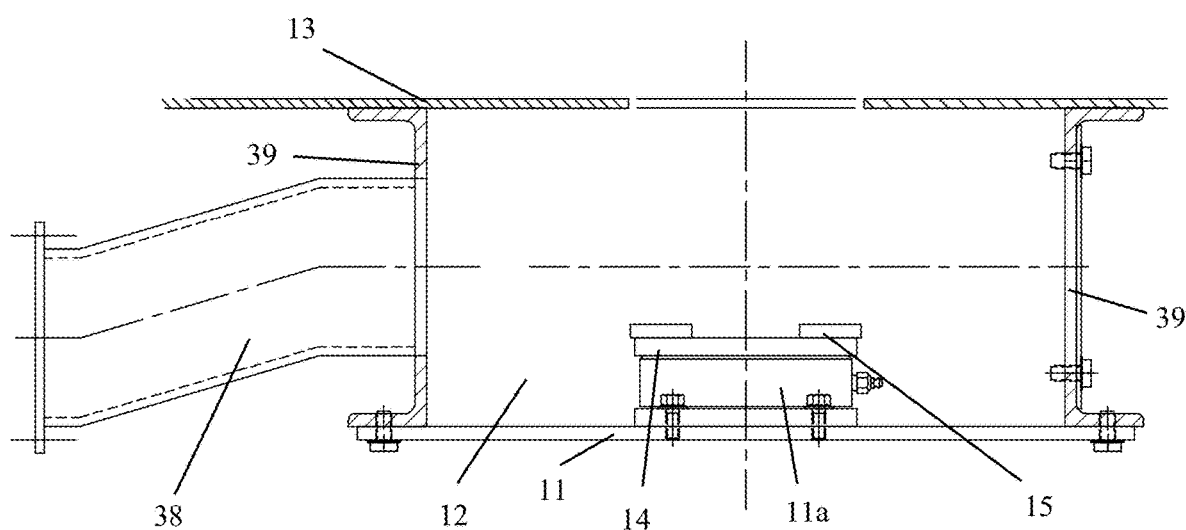
FIG. 8 shows detail of the bottom bearing mount in vertical cross section.
Figure 8A:
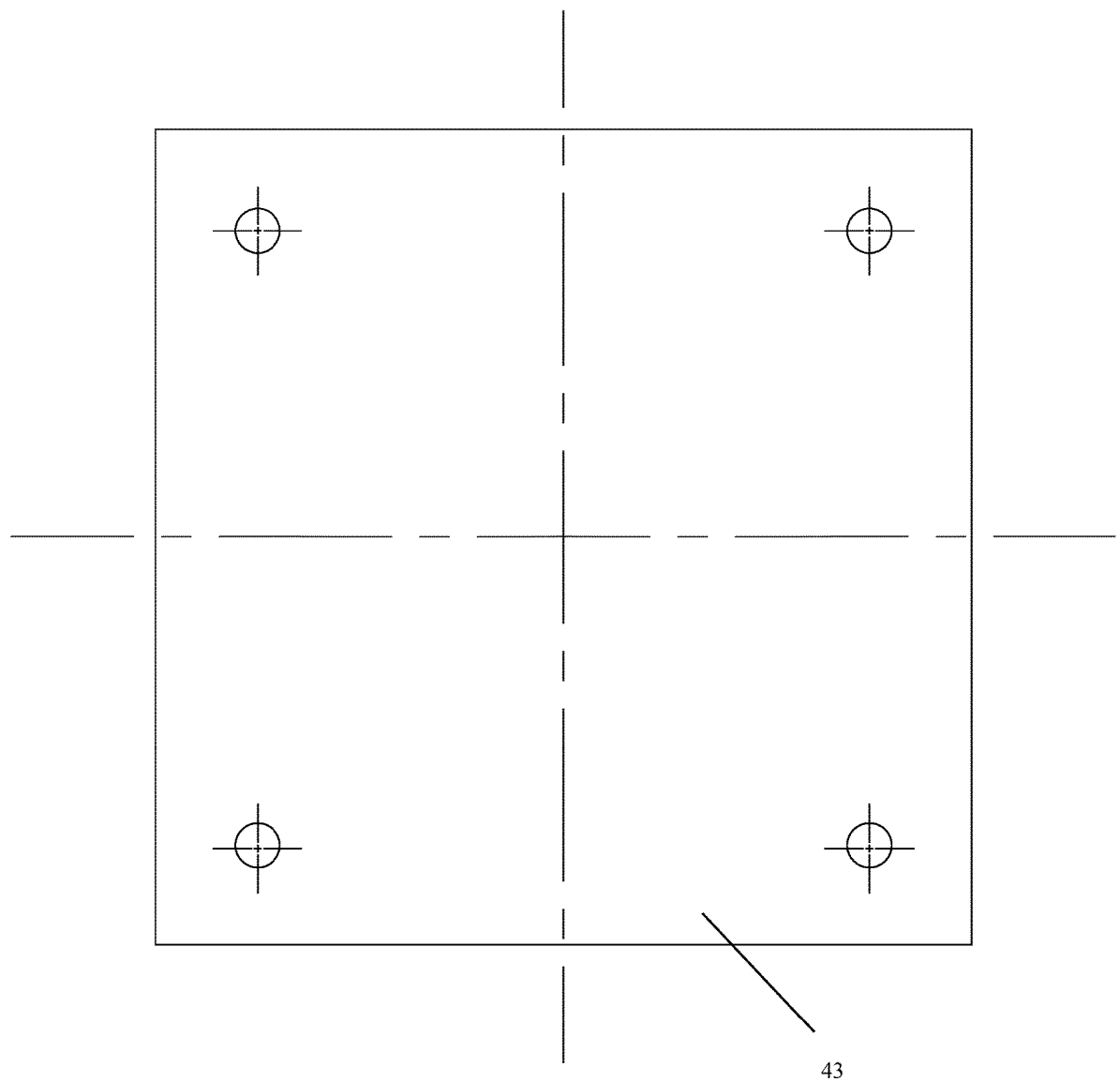
FIG. 8a shows an elevation view of the access plate, removable to access the bottom bearing mount components.
Figure 9:
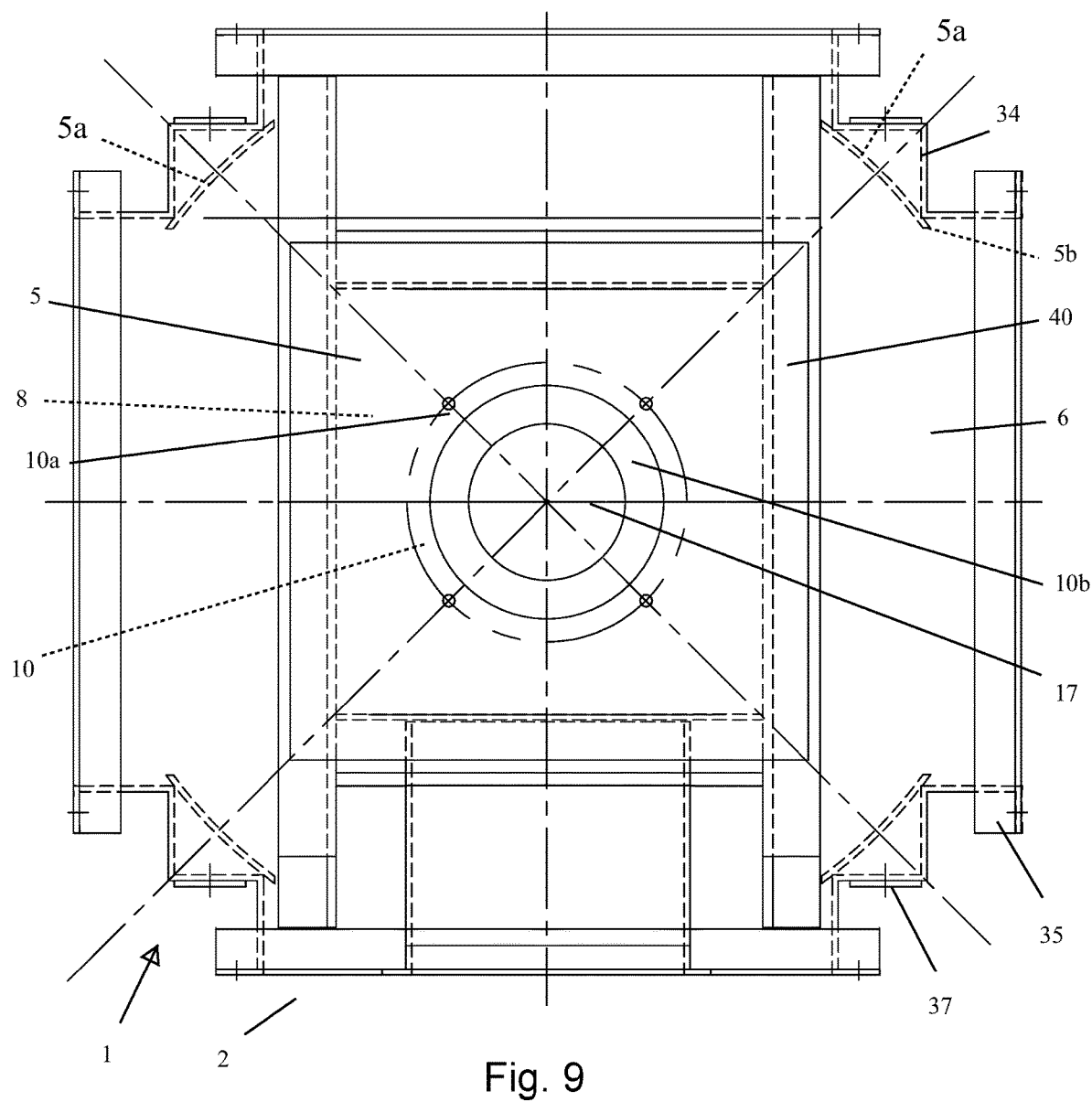
FIG. 9 shows a top cross-sectional view through A-A of FIG. 14.
Figure 10:
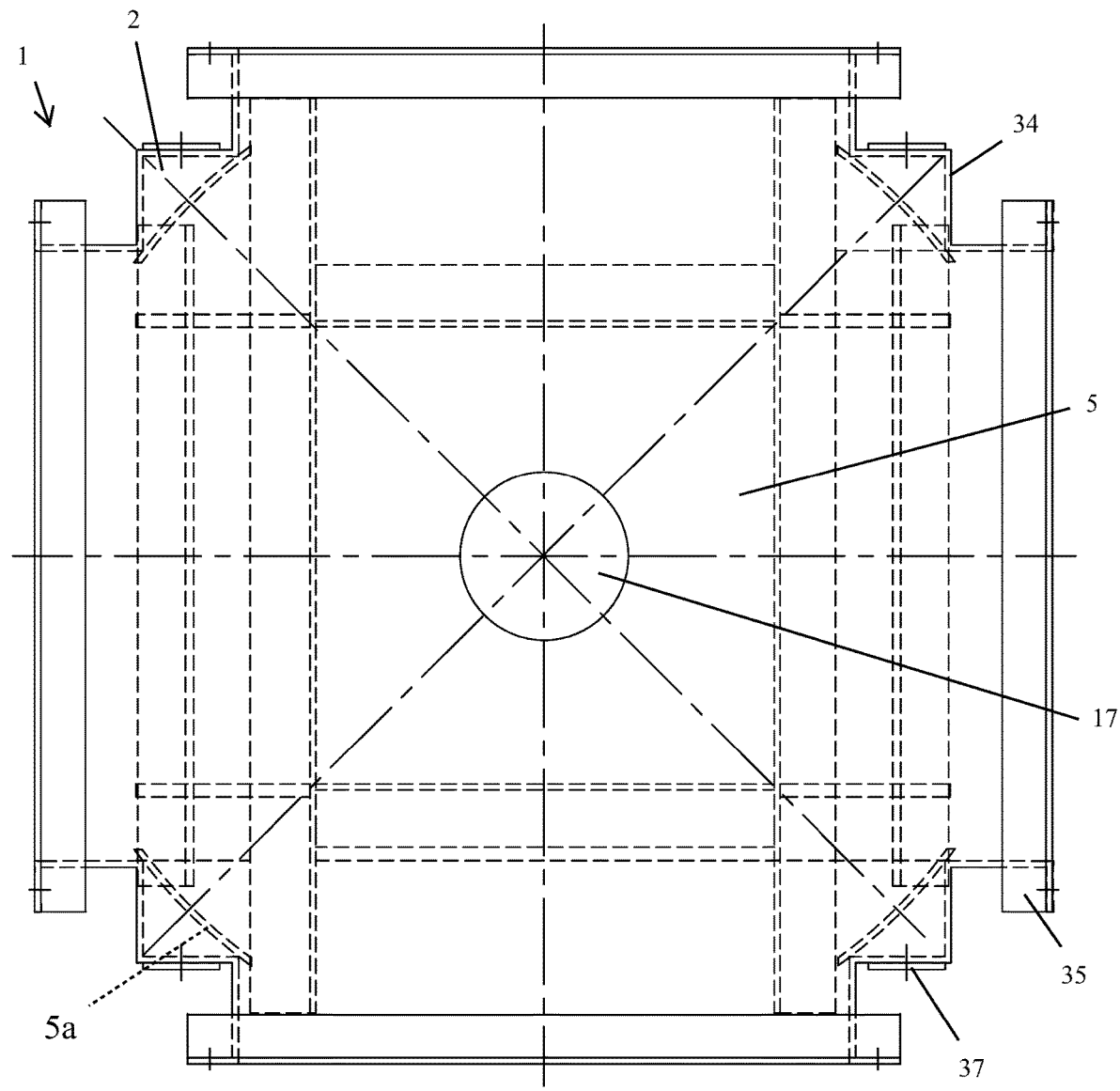
FIG. 10 shows section C-C of FIG. 14.
Figure 11:
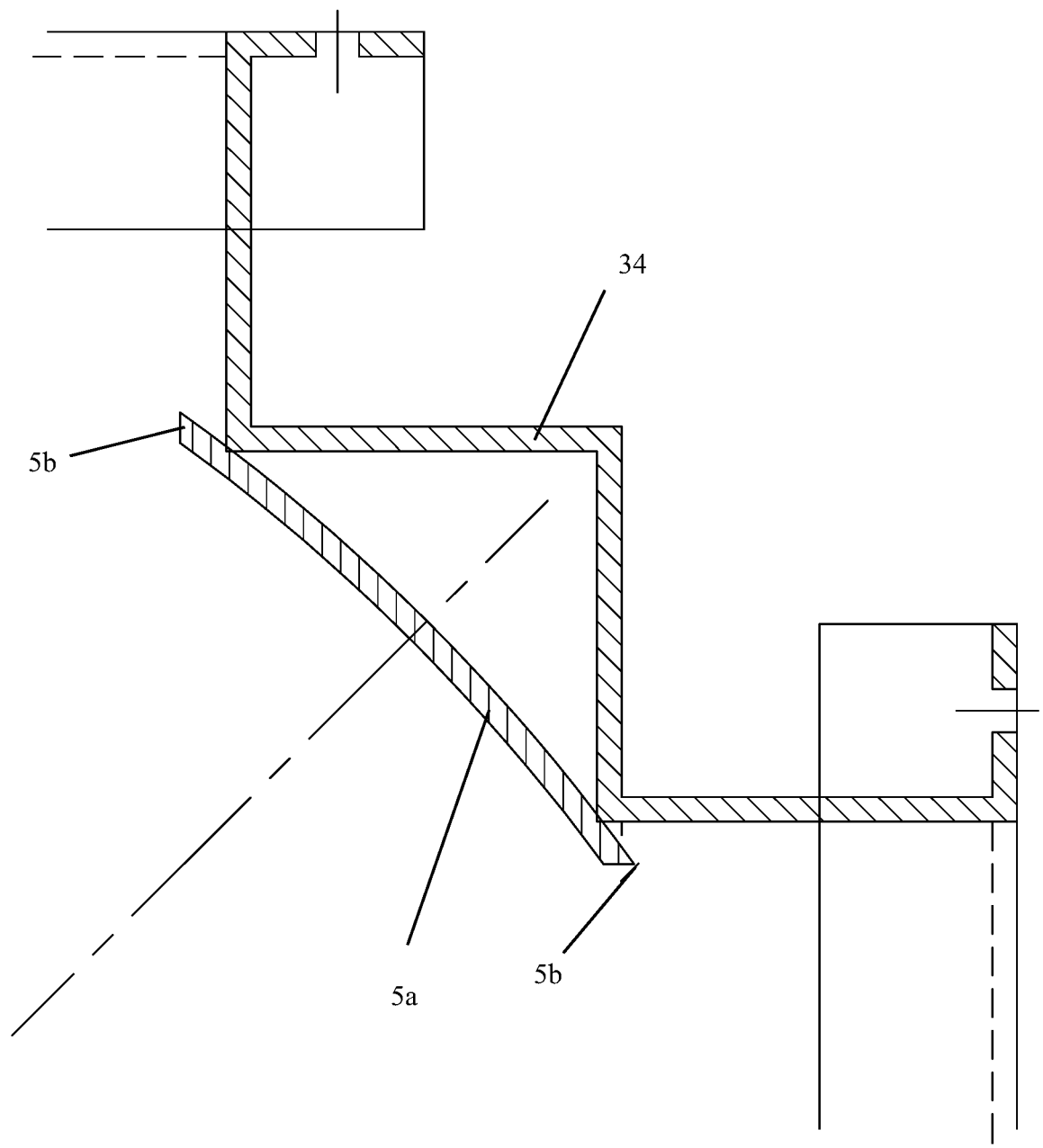
FIG. 11 shows detail in horizontal cross-section of the corner of the indexing valve 1.
Figure 12:
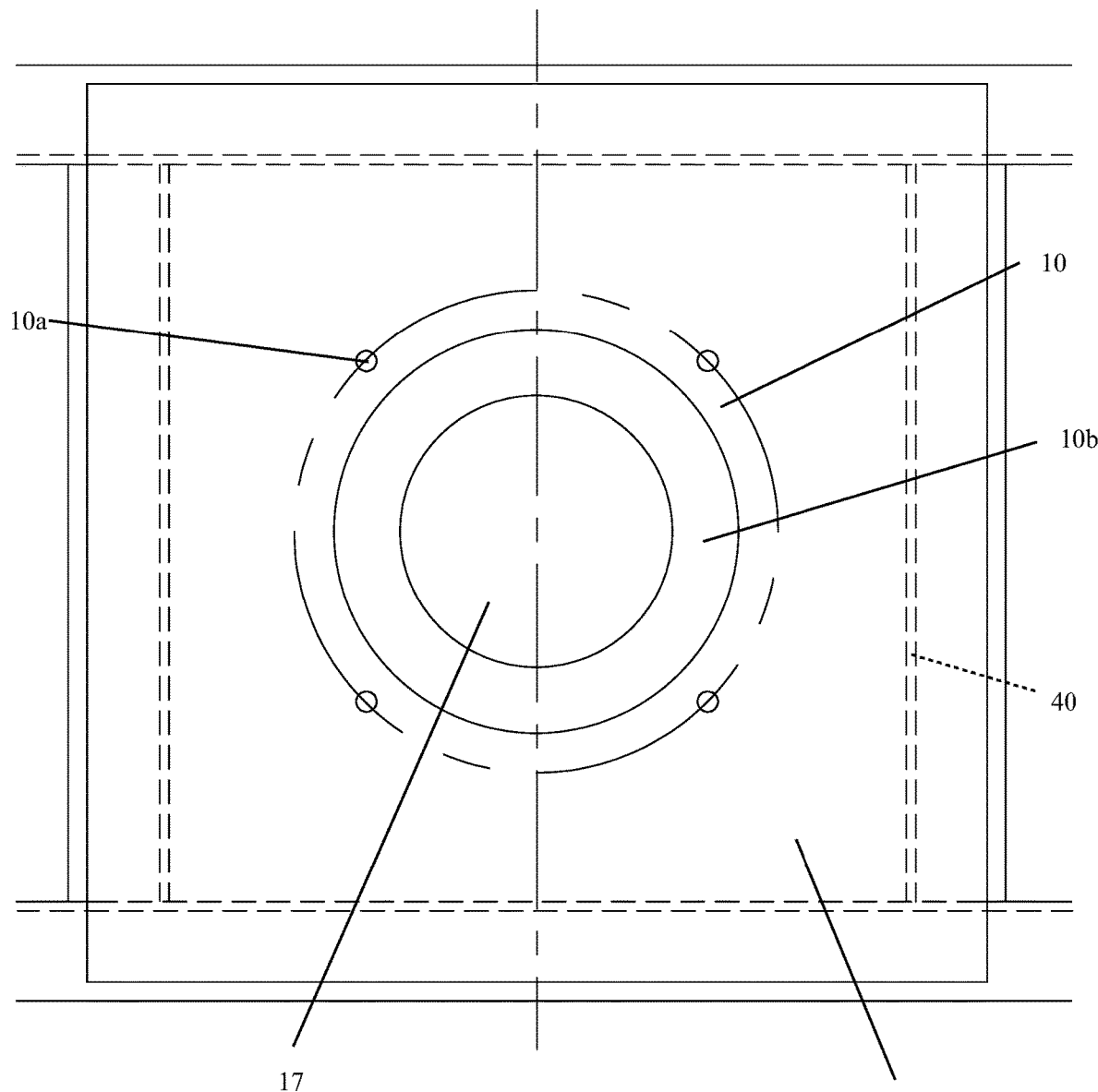
FIG. 12 shows overhead detail of the top motor mount.
Figure 13:
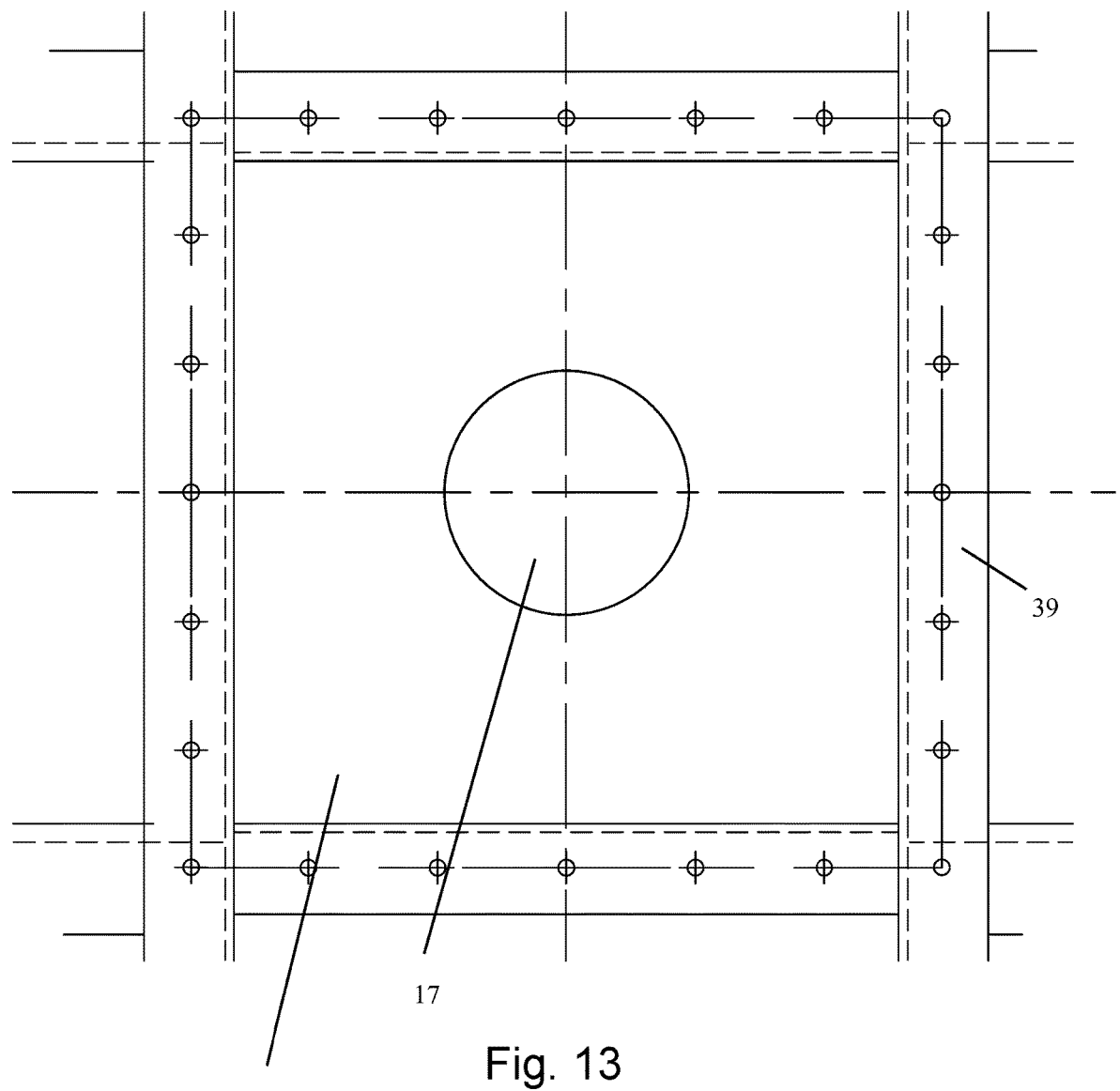
FIG. 13 shows bottom-view detail of the bottom bearing mount.
Figure 14:
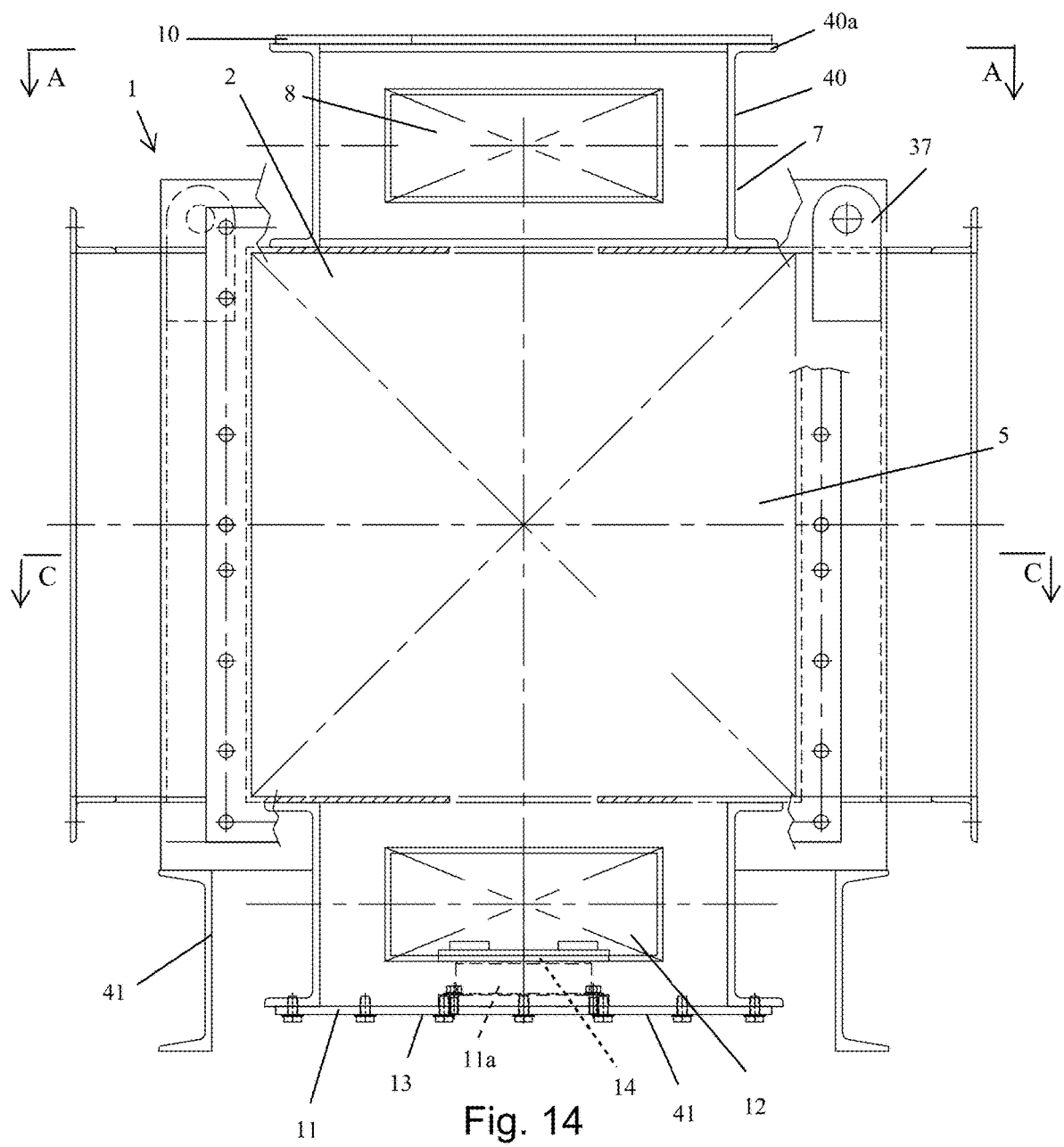
FIG. 14 shows a partially broken, front view of the valve housing.
Figure 15:
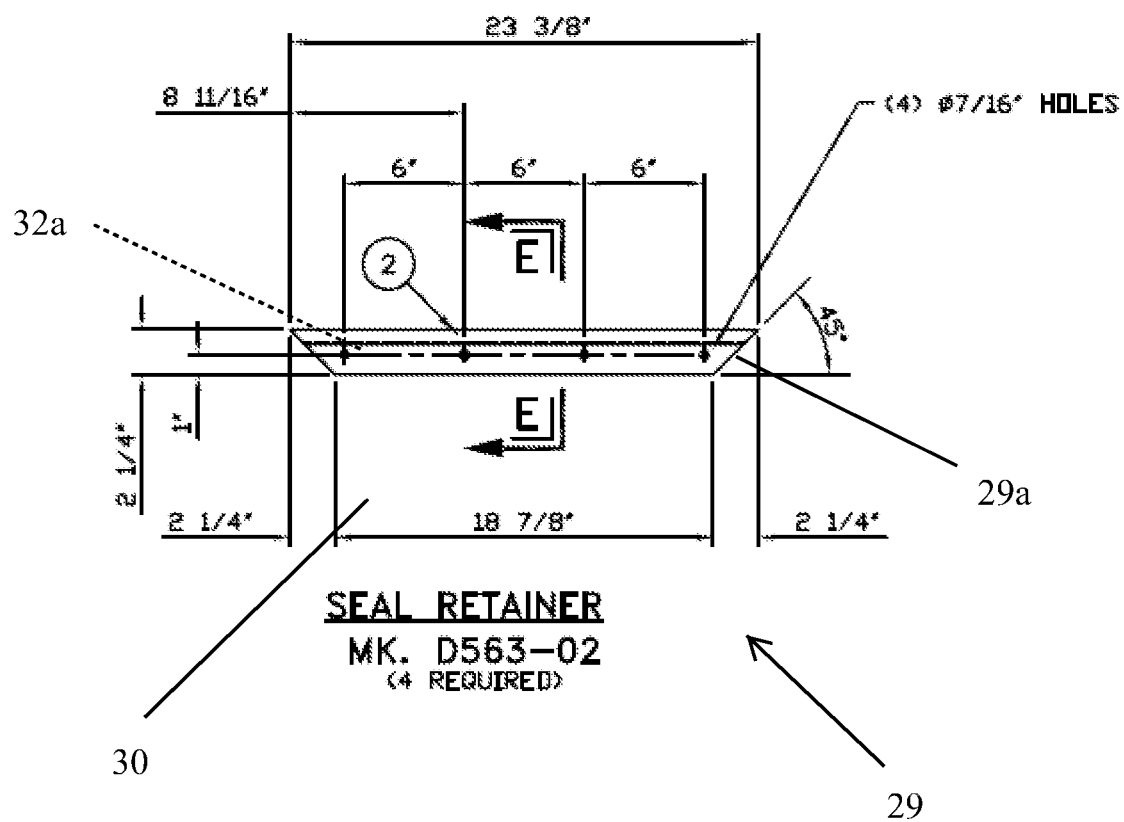
FIG. 15 shows an elevational view of the seal retainer subassembly.
Figure 15A:
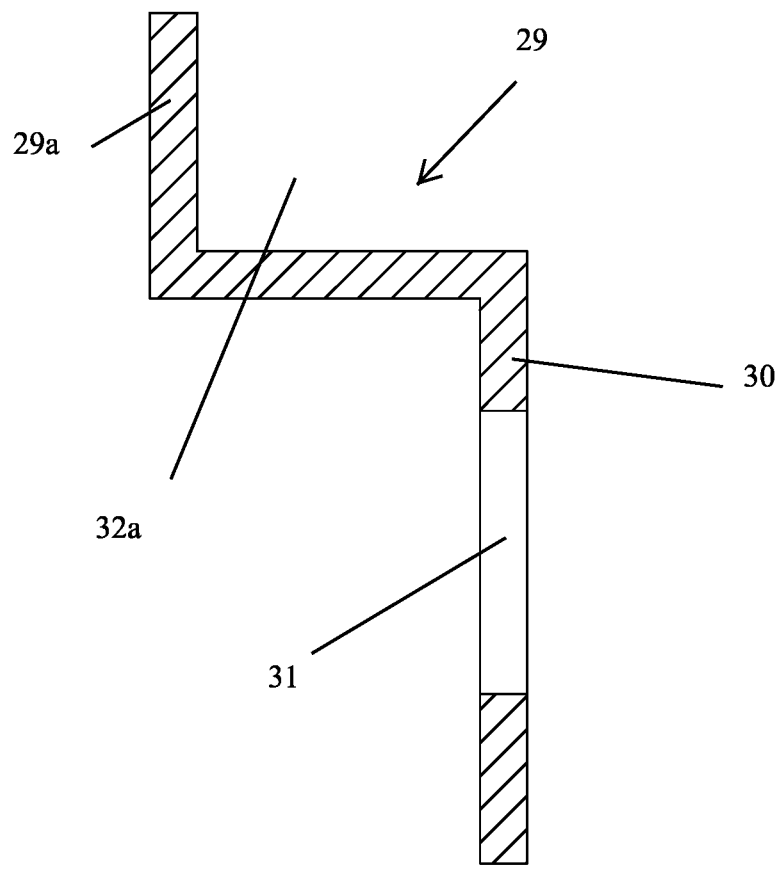
FIG. 15a shows a vertical cross-sectional view of the brace and retainer lip of the seal retainer subassembly.
Figure 16:
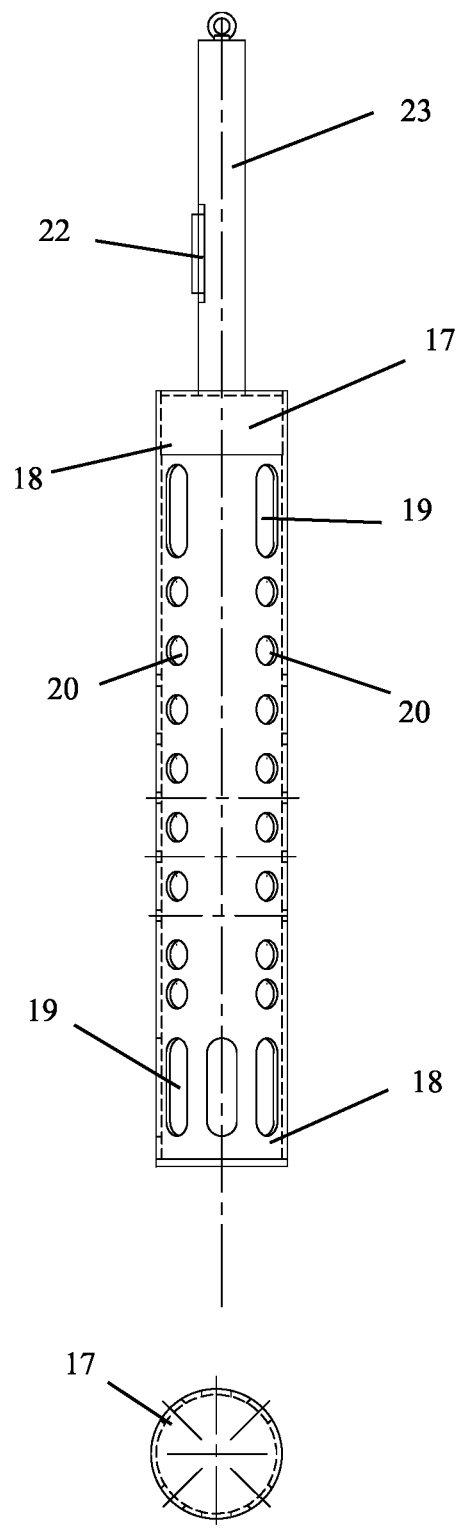
FIG. 16 shows both a side elevational view of the shaft components and a top view thereof.
Figure 17A:
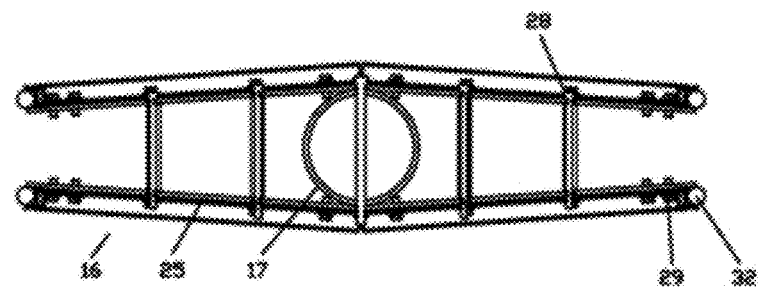
FIGS. 17a and 17 show top and side elevation views of the diverter blade subassembly.
Figure 17:
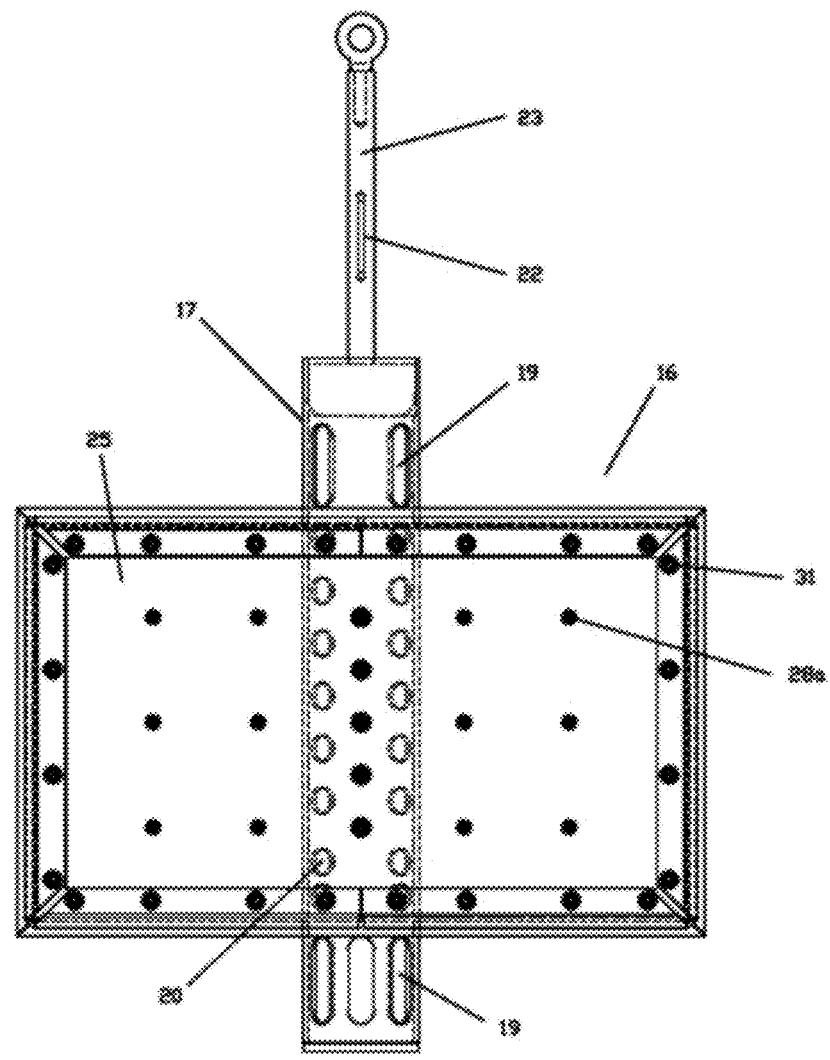
Figure 18:
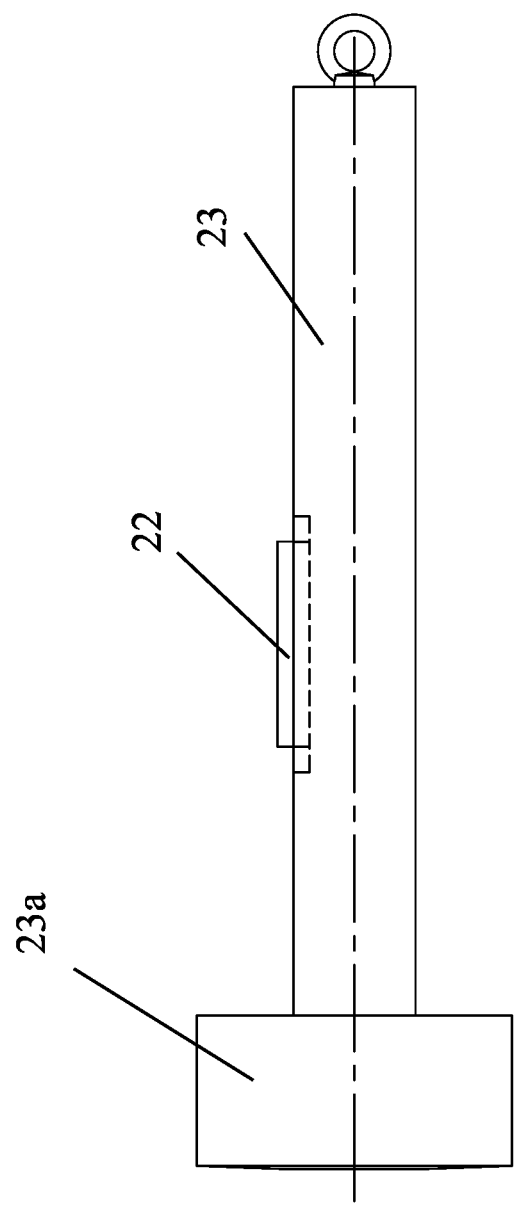
FIG. 18 shows an elevation view of the stub shaft.
Figure 19:
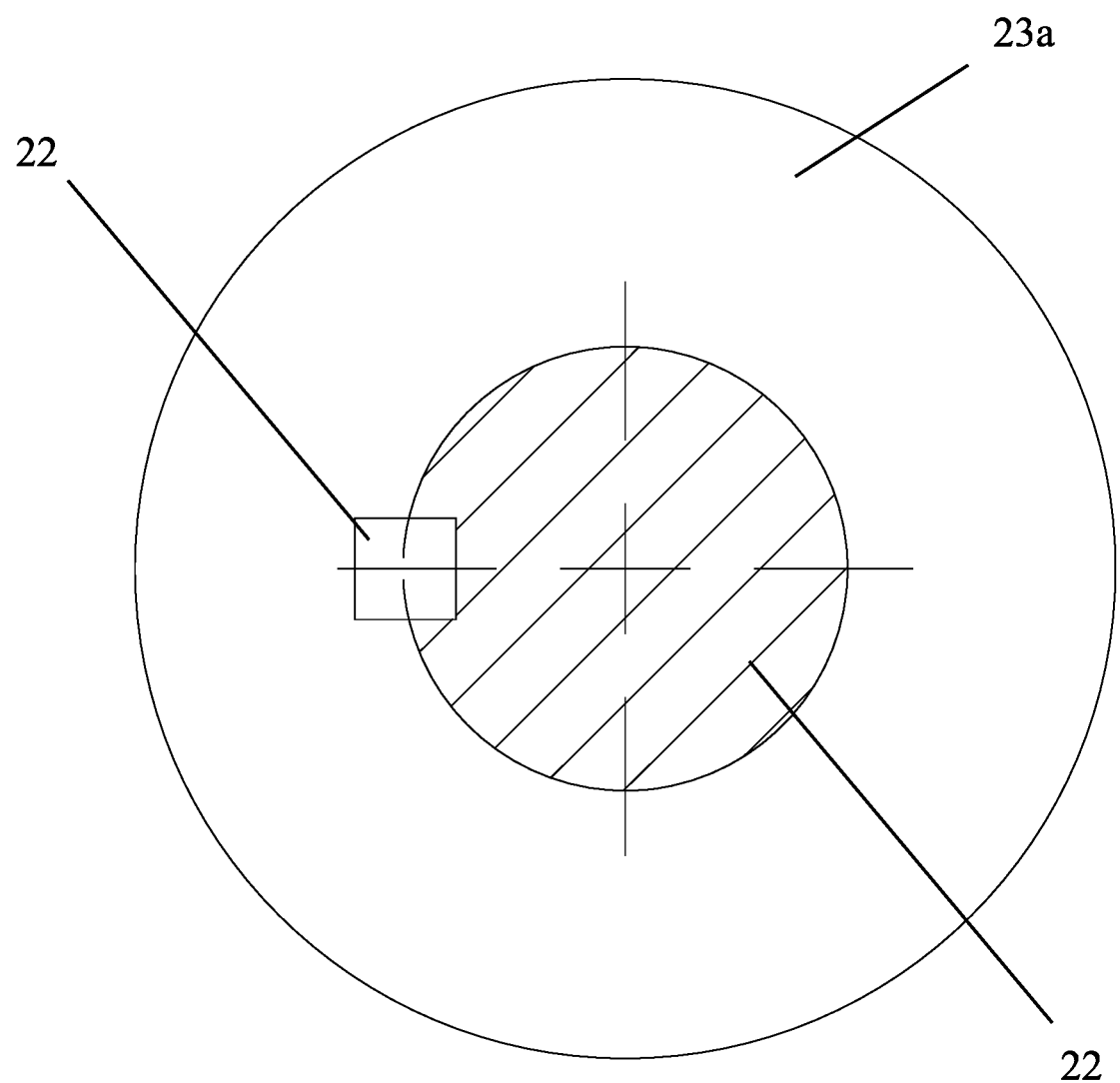
FIG. 19 shows detail of the keyway, i.e. cross-section through the horizontal plane of FIG. 18.
Figure 20:
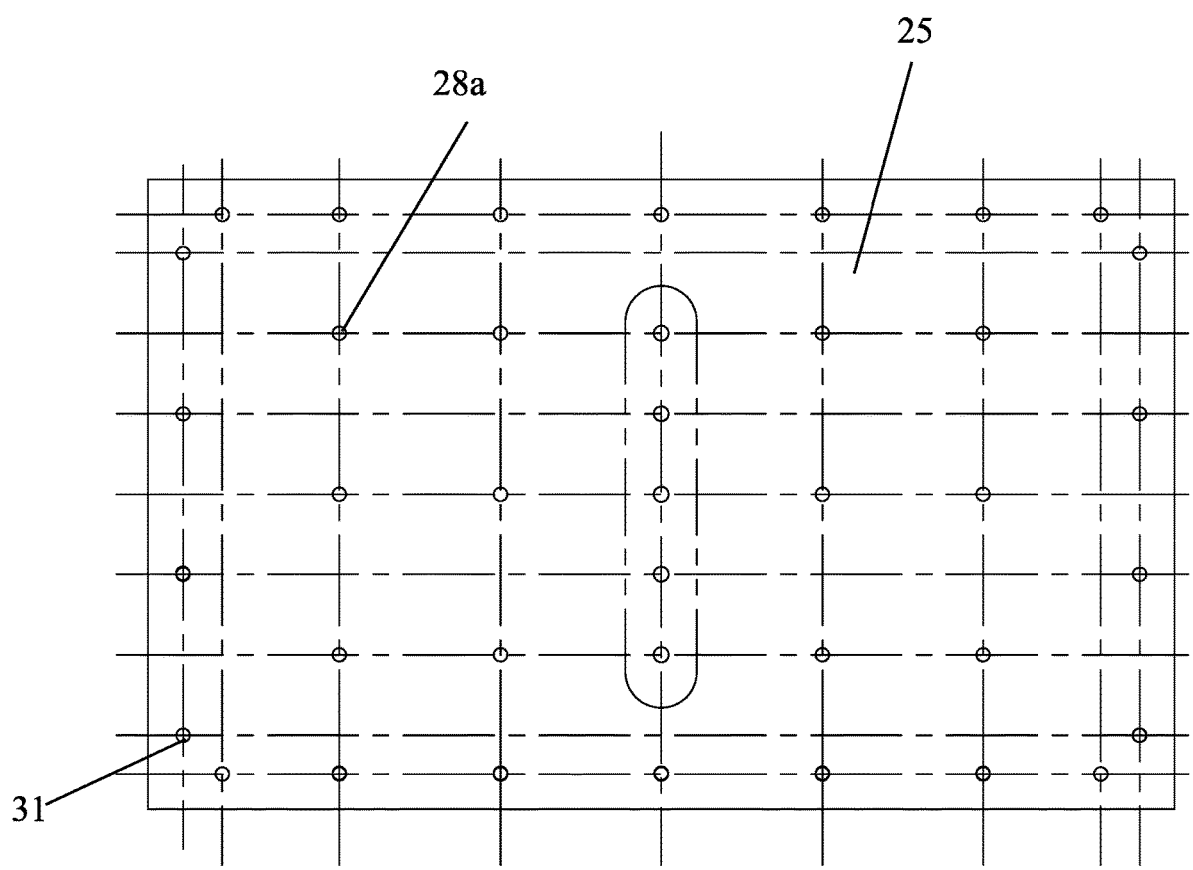
FIG. 20 shows additional detail of the diverter plate as viewed through a vertical plane.
Figure 21:
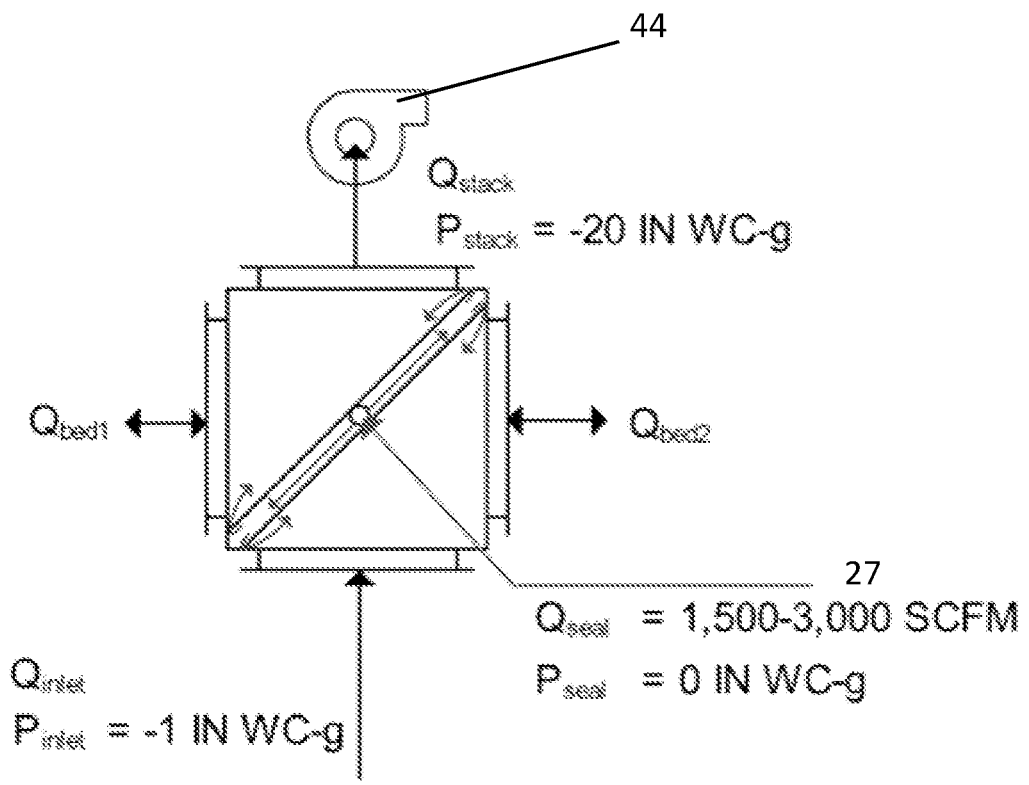
FIGS. 21-23 show diagrammatic representations of the purge fluid system.
Figure 22:
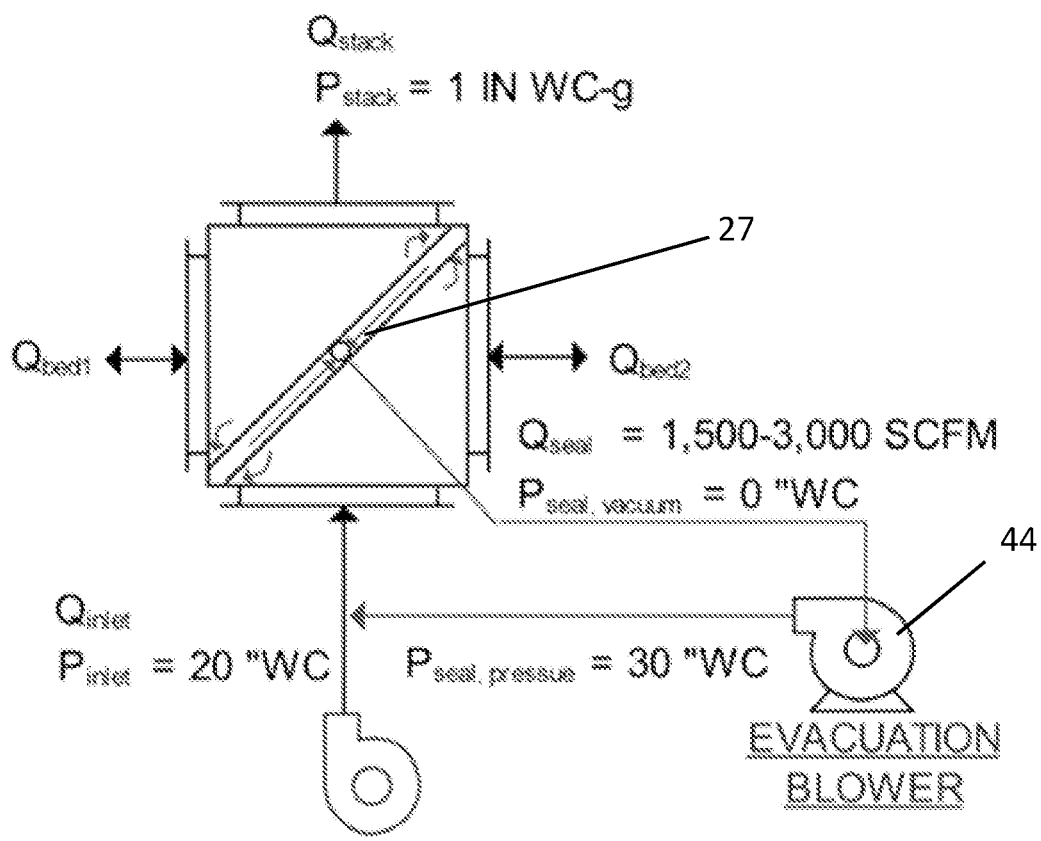
Figure 23:
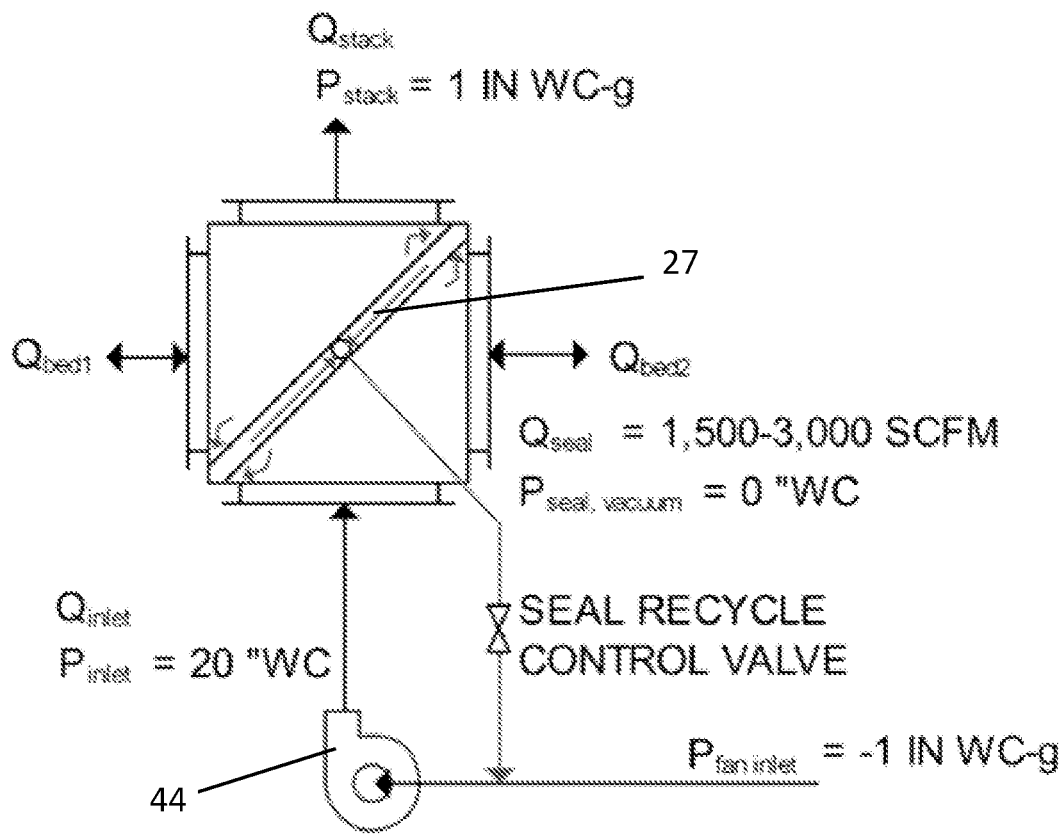

FIGS. 1-3 show a prior art fluid flow diverter. A drive motor and controller assembly include an electric motor 42, a gear reducer 44, control components 46, and a variable speed drive controller 48. The motor 42 turns the drive shaft 27 via the gear reducer 44, which is connected to the top extension of the drive shaft 27. The control components 46 (e.g., proximity switches) are located on the drive shaft 27 and provide position information to the variable speed drive controller 48. The drive controller 48 regulates the speed of the motor 42 to control the rotation speed, along with the acceleration and deceleration, of the drive shaft.

The rotation of the drive shaft 27 is controlled by the drive controller 48 such that the plenum 26 controllably rotates within the diverter body 28 through the motion generated by the motor 42. The plenum 26 is made to repeatedly rotate 90° in the same direction in timed increments, so as to repeatedly switch between the two fluid flow patterns.

As is known in the art, the diverter defines several fluid flow passages through which gases flow as directed by the position of a rotating plenum 26 within the diverter. When the plenum 26 is in a first stop position, the inlet port 21 is in communication with the second port 22, and the outlet port 24 is in communication with the third port 23. Thus, the process gases from the process stream follow a first flow path through the diverter that enters at the inlet port 21 and exits at the second port 22. The gases then pass through a first heat exchanger, into the combustion chamber, and out through a second heat exchanger. The gases exiting the outlet port 24 are sent to the exhaust stack. With this flow, the process gases are heated in the first heat exchanger (whose media was heated in the previous cycle) before entering the combustion chamber. And the hot gases exiting the combustion chamber transfer heat to the heat exchange media of the second heat exchanger.

Still with reference to the prior art, a purge fluid assembly includes a purge fluid propelling device 50 (e.g., a high-pressure fan or blower), first solenoid and valve 55 and 56, and second solenoid and valve 57 and 58. First and second purge fluid input ports 52 and 54 are located on the top and bottom of the diverter body 28. These purge fluid input ports are aligned in a diagonal arrangement from corner to corner on the top and bottom of the body so as to form an X-shaped pattern. The valves within the closed passageways, under control of the solenoids, direct the purge fluid to the purge fluid input ports that align with the current stop point of the plenum. Here, the fan 50 supplies the purge fluid (e.g., air) to the plenum 26 through two distinctive paths. The first purge fluid path goes through the first valve 56, into a first closed passageway 51, and then through the first purge fluid input ports 52. The second purge fluid path goes through the second valve 58, into a second closed passageway 53, and then through the second purge fluid input ports 54. The drive controller 48 controls the solenoids 55 and 57 so that the corresponding valves 56 and 58 direct the flow of the purge fluid through the desired closed passageway to the connected input ports. Each of the distinctive purge fluid paths is selectively activated to coincide with one of the diagonal stop positions of the plenum, so that the purge fluid enters the plenum through the input ports on the diagonal that currently aligns with the plenum. Of note in the prior art is that the sealed diverter is purged affirmatively with a positive pressure purge fluid and not a negative pressure fluid nor even atmospheric pressure.

Also of note in the prior art is that the rotating plenum 26 of this exemplary embodiment is cuboidal in definition formed by two, flat steel plates 70 and 71 that are connected together by equal-length bolts that each pass through a spacer 72. This creates the hollow rectangular, cuboid shape of the rotating plenum. Additionally, bristled brush seals 76 make contact with the rounded corners 78 to generate an air seal baffle, thus the seal retainer varies as to the current embodiment, as follows.

Referencing now FIGS. 4-23, shown is the instant indexing valve 1. "A" or "an" as used in the claims mean one or more. Indexing valve 1 is an assembly that generally includes five main sub-assemblies, namely: (i) a valve housing 2; (ii) a diverter assembly 16 with its diverter blade subassembly 24; (iii) gear motor 33 subassembly; (iv) a seal retainer subassembly 29; and, (v) purge fluid subassembly (as part of the entire RTO working in cooperation with the indexing valve 1).

The valve housing 2 is preferably generally rectangular, although the shape may vary. Valve housing 2 has a housing top 3, a housing bottom 4, a housing interior 5 and one or more ports 6. In this preferred embodiment the valve housing 2 is made from plate and angle iron. Steel plate rolling is not required as is needed on a round valve housing 2. Bottom beams 39 and top beams 40 are added to the top and bottom plates of the valve housing 2 for added strength, and other support beams are integrated into the airbox. These bottom beams 39 and top beams 40 are essentially support skids that help with removal and serviceability of the valve assembly 1. Note the top beam 40 includes an upper flange 40a extending radially therefrom. A roof plate 9 on the housing top 3 is generally the roof of the valve housing 2, and a floor plate 13 is disposed at the housing bottom 4 to generally form the floor of the valve housing 2. Housing top 3 further includes a top motor mount 7 attached thereto. The top motor mount 7 resides on the roof plate 9 and is formed by the rigid top beam 40 extending from the housing top 3. An upper air box 8 is thereby defined within the top motor mount 7 for reducing pressure drop within the indexing valve 1, as an air duct extends from the upper air box 8. Next, at the housing bottom 4, attached is a bottom bearing mount 11 formed by the rigid bottom beam 39 extending from the floor plate 13 of the housing bottom 4. This bottom beam 39 and therefore the bottom bearing mount 11 terminates to form the base 41 for securing the indexing valve 1 to the structural skid (not shown) on which the indexing valve 1 can sit and slide. The structural skid is the component that also supports the RTO vessel. The bottom bearing mount 11 also defines the lower air box 12 from which an air duct would extend. Thus, the air duct comes out of the lower air box 12 and the upper air box 8. "Lower" or "upper" in relation to the air box implies a vertical orientation of the shaft, although the orientation could also be horizontal, i.e. "opposing", so "lower" or "upper" is meant to encompass either orientation.

The valve housing 2 also having corners, typically four, with each corner between each port (in the generally rectangular embodiment). One or more lifting lugs are attached to the valve housing 2 at each of these corners, thus the equipment is structurally designed and located to allow easy lifting of the equipment by crane or forklift. With continued reference to the corners, when the valve housing 2 has four ports 6 and four corners (or variable) including within the valve housing 2 at each corner is a curved corner section 5a as shown (FIGS. 5, 9-11). The curved corner sections 5a each has two corner section ends 5b, and each corner section end 5b extends beyond the width of each corner to thereby extend into at least one of the ports 6 as shown. "Width" here means the hypotenuse length formed by the right-angled corner. Extended curved corner sections 5a eliminate or reduce seal tear and abrasion and eliminate interferences. In this manner, sealing at the port 6 is enhanced, as further described. The corner section ends 5b are also chamfered (also intended to mean beveled) to limit seal wear.

Referencing now the diverter assembly 16, the diverter assembly 16 resides within the valve housing 2, disposed therethrough as shown. Diverter assembly 16 includes a rotatable, hollow pipe shaft 17. The hollow pipe is less restrictive than an annular opening and less expensive and lighter than a solid shaft. Pipe shaft 17 has two pipe shaft 17 ends. A stub shaft 23 is connected to the pipe shaft 17 transitioning vertically from the pipe shaft 17 up through the housing top 3. A plurality of air-flow holes 20 are defined with the pipe shaft 17. A plurality of thru-slots 19 which differ in shape are also defined within the pipe shaft 17, albeit more proximate to each pipe shaft 17 end. The aforementioned air-flow holes 20 with their geometry is also less restrictive, thereby allowing more air into the diverter.

A diverter blade subassembly 24 is connected to the pipe shaft 17 between the pipe shaft 17 ends. Diverter blade subassembly 24 thereby is meant to rotate (i.e. swing) within the valve housing 2. The curve of the curved corner sections 5a matches the radius of the diverter plate swing. Thus, diverter blade subassembly 24 comprises a pair of opposing diverter plates 25. Critically, each diverter plate 25 is also curved (away from center) as shown, i.e. each diverter plate 25 is bent out-of-plane. Being curved, the diverter plates 25 in combination define a non-cuboidal, large-volume inlet plenum 27 therebetween in which fluid flow, such as air, can be received (from one of the ports 6). Such an oval-like shape of the inlet plenum 27 is beneficial versus a smaller plenum resulting from linear plates. In other words, the diverter plate 25 is curved and has an interior inlet shaft of large size. The diverter plate 25 being curved and oval-like as shown rather than rectangular/straight across linear edges allows for a large inlet shaft, while maintaining small seat locations. Multiple spacer bolts 28 connect the diverter plates 25. Each spacer bolt 28 would vary in length to coincide with the oval-like shape of the inlet plenum 27 since the diverter plates 25 are curved. Of further note is that all of the air-flow holes 20 of the pipe shaft 17 are confined within the inlet plenum 27, and all of the defined thru-holes are outside of the inlet plenum 27.

Each diverter plate 25 has two end edges 26 defining its height. At each of the end edges 26, the seal retainer subassembly 29 is disposed. The seal retainer subassembly 29 is a piece of material that is shaped to clamp and hold a gasket on the diverter plate end edges 26 (i.e. perimeter) using screws through a retainer fastener hole 31. More particularly, the seal retainer subassembly 29 includes the seal 32. The seal 32 is positioned to seal against the curved corner sections 5a. The corner sections 5a are positioned the exact length of the diverter plates 25 such that the diverter plate 25 cannot protrude from the valve housing 2, and the chamfered corner section ends 5b reduce seal edge abrasion which can cause seal failure. The seal retainer subassembly 29 is S-shaped, formed of an elongate brace 30 which transitions to an upstanding retainer lip 29a. The retainer lip 29a overhangs the elongate brace 30, thereby defining a seal housing 31a for the seal 32 itself. In the preferred embodiment the seal is a tadpole seal 32. Tadpole seals 32 are typically made of materials such as silicone, PTFE and viton-coated fiberglass. Here, rigid, Kevlar tadpole seals 32 are utilized to line the diverter blades for increased abrasion resistance.

Now with reference to the gear motor subassembly, a gear motor 33 drives the pipe shaft 17 and thus the diverter blade subassembly 24. The gear motor 33 thus cooperates with the stub shaft 23 for driving the diverter blades. A size of the gear motor can be optimized by calculating a mass and a torque of the diverter blade subassembly 24. Gear motor 33 is attached to stub shaft 23 by providing a keyway 22 formed on the stub shaft 23. This keyway 22 corresponds to a notch on the gear motor for securement in which a rectangular key can be placed to lock the orientation of the pipe shaft 17 to the gear motor 33. As above, the top motor mount 7 is attached to the housing top 3 formed by top beam 40 which not only defines the upper air box 8 but also supports the gear motor 33 using a motor mount plate 10 disposed over the rigid top beam 40 onto which the gear motor 33 rests and its weight carried thereon. As shown, motor mount plate 10 is non-integral with the rigid top beam 40, disposed on the upper flange 40a of top beam 40. Accordingly, the gear motor 33 drives the diverter blade subassembly 24 within the valve housing 2 to thereby divert fluid flow to another of the ports 6. More particularly, as is known, the rotation of the stub shaft 23 is controlled by a control system such that the inlet plenum 27 controllably rotates within the valve housing 2 through the motion generated by the motor 33. As such, the inlet plenum 27 is made to repeatedly rotate 90° in the same direction in timed increments (with the aid of the stop collar), so as to repeatedly switch between the two fluid flow patterns. The oval shape of thru-slots 19 maximize air flow through the pipe shaft 17.

Opposite the gear motor, a bearing assembly 11a is attached to the base (i.e. within the lower air box 12) on which the pipe shaft 17 can ride and be supported through its rotation. More particularly, a turntable 14 is attached to the bearing assembly 11a. A nipple connector 15 is attached to the turntable 14. One of the pipe shaft 17 ends is connected to the nipple connector 15, wherein the pipe shaft 17 is supported at the base in lieu of being supported solely by the gear motor 33. An access plate is removably attached to the bottom bearing mount 11 to allow access to the bearing assembly 11a to aid in repair, thus care was taken to allow access to the bearing which is in the lower air box 12. So, note the pipe shaft 17 is supported grease free rather than suspended from the gear motor 33 using only a collar.

FIGS. 20-23 show diagrammatic representations of the purge fluid assembly. The purge fluid assembly would be external the indexing valve 1, communicating therewith, comprising part of the make-up of the entire regenerative thermal oxidizer system. Thus, here, the regenerative thermal oxidizer would comprise a combustion chamber, heat exchangers in flow communication with the combustion chamber, the instant valve housing 2 in flow communication with the heat exchangers, then this fluid flow means in communication with the input port 6a of the valve housing 2 for providing the fluid flow. Critically here, the fluid flow is either atmospheric pressure or negative pressure relative to the valve housing 2. Therefore, an entire purge fluid assembly itself can be omitted; or, a negative pressure fluid system (as opposed to a positive pressure system) communicates with the inlet plenum 27. In one embodiment, the negative pressure fluid system is an evacuative assembly 44 such as an evacuative blower 44. Thus, a non-positive purge fluid is provided to the diverter blade's inlet plenum 27, and in the preferred embodiment consists of either atmospheric pressure or a negative pressure fluid assembly. Known in the art are positive pressure purge fluid systems, wherein a blower forces a fluid (air) into the diverter, thereby increasing the pressure within the diverter relative to the valve housing 2. Experimentation has shown that, first, the purge fluid assembly can be entirely eliminated, thereby utilizing atmospheric pressure. What results is a low pressure, high flow, which is more energy efficient and better at creating a seal compared to the high-pressure low flow compressors. Alternatively, a negative pressure fluid system can be provided which uses an evacuative assembly to produce a lower pressure within the diverter blade relative to the valve housing 2, as shown, which also creates a suitable seal. Accordingly, the interior of the hollow inlet plenum 27 is pressurized statically or by using negative pressure with sufficient pressure to overcome the system pressure. Therefore, clean purge fluid exits above and below the inlet plenum 27 and is forced out of the corresponding plate holes 28a of diverter plates 25. The allowance or introduction of the purge fluid between the fluid streams minimizes or prevents leakage between the flow paths as the flow through each port is kept separated to ensure zero (or at least minimal) leakage of process contaminants from the inlet to the outlet of the system.

Figure 24:
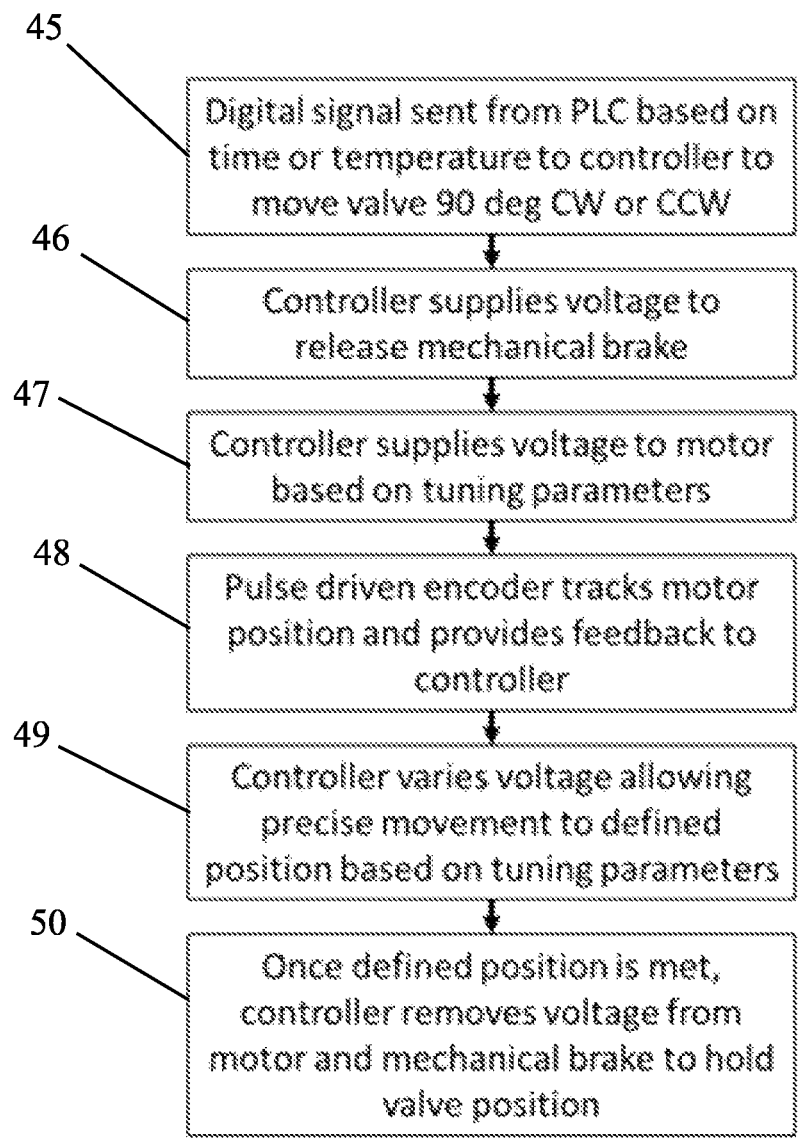
FIG. 24 is a flow diagram of the control system.

Now referencing FIG. 24, The control system and controller assembly are summarized below and can also be represented by the as-shown flow chart. The flow represents a method with logic or programing that can be executed by a specialized device or a computer and/or implemented on computer readable media or the like tangibly embodying the program of instructions. Thus, the control system may be described in the general context of computer-executable instructions, such as program modules, being executed by a computer. Generally, program modules include routines, programs, objects, components, data structures, etc. that perform particular tasks or implement particular abstract data types.

By way of example, and not limitation, computer readable media may comprise computer storage media and communication media. The system memory may include computer storage media in the form of volatile and/or nonvolatile memory such as read only memory (ROM) and random access memory (RAM). The data or program modules may include an operating system, application programs, other program modules, and program data. At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool.

The control system was completely built from the ground up using new logic and components. The software is modernized using the functionality of the stepper motor compared to the hardwired switches in older designs. From above, timing commands from the controller assembly start the gear motor to initiate rotation of the pipe shaft. More particularly, a digital signal is sent from the programmable logic controllers (PLC) based on time or temperature to the controller to move the valve ninety-degrees (90°) clockwise or counter-clockwise 45. The controller supplies voltage to release the mechanical brake 46. Controller supplies voltage to motor based on tuning parameters 47. The pipe shaft, carrying the diverter plates, accelerates to a predetermined speed and then, after predetermined rotation, the control components are triggered to start deceleration. Pulse drive encoder tracks motor position and provides feedback to controller 48. Controller varies voltage, allowing precise movement to defined position based on the tuning parameters 49. Once defined position is met, controller removes voltage from motor and mechanical brake to hold valve position 50. The controller assembly thus stops the stub shaft when the inlet plenum has rotated the full 90° to its next predetermined stop position. The general summary of flow features: (i) the program uses one (1) homing switch. Older programs had no homing functionality; (ii) the program uses the PLC to control to exact position using 90-degree increments. Older programs use four (4) switches to trigger when to begin stopping. If these physical switches moved, the valve position would be incorrect; (iii) the program has proof of position switches to ensure the valve is in the correct orientation; and, (iv) the instant program adds a bypass position which is critical for equipment high temperature or shut down scenarios.

Therefore, as described, the instant indexing valve 1 defines several fluid flow passages through which industrial process gases flow as directed by the position of the diverter blade subassembly 24. When the inlet plenum 27 is in a first stop position, a first of the ports 6 (i.e. inlet port) is in communication with the second port, and an outlet port is in communication with the third port. Thus, the industrial process gases from stream follow a first flow path through the diverter blade subassembly 24. The gases then pass through a first heat exchanger, into the combustion chamber, and out through a second heat exchanger. The gases exiting the outlet port are sent to the exhaust stack.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. An indexing valve, comprising:
a valve housing, said valve housing having a housing top, a housing bottom, a housing interior and four ports;
a top motor mount attached to said housing top, said top motor mount residing on a roof plate of said housing top, said top motor mount further comprising:
a rigid top beam extending from said housing top, said rigid top beam having an upper flange extending radially therefrom; and, a motor mount plate non-integral with said rigid top beam, said motor mount plate disposed on said upper flange over said rigid top beam;
a diverter assembly within said valve housing, said diverter assembly further comprising:
a pipe shaft having two pipe shaft ends, said pipe shaft disposed through said valve housing;
a stub shaft connected to said pipe shaft transitioning vertically from said pipe shaft;
a diverter blade subassembly connected to said pipe shaft between said pipe shaft ends for rotating within said valve housing, said diverter blade subassembly further comprising a pair of opposing diverter plates, each said diverter plate bent out-of-plane to thereby be curved, wherein a non-cuboidal, large-volume inlet plenum is defined between said diverter plates for receiving fluid flow from one of said four ports;
a bottom bearing mount attached to said housing bottom, said bottom bearing mount forming a base, wherein said base supports said pipe shaft; and,
a gear motor on said motor mount plate, said gear motor communicating with said stub shaft for driving said diverter blade subassembly within said valve housing to thereby divert said fluid flow to another of said ports.

2. The indexing valve of claim 1, further comprising an upper air box defined within said top motor mount for reducing pressure drop.

3. The indexing valve of claim 1, further comprising said bottom bearing mount formed by a rigid bottom beam extending from a floor plate of said housing bottom.

4. The indexing valve of claim 3, further comprising: a bearing assembly attached to said base; a turntable attached to said bearing assembly; a nipple connector attached to said turntable; one of said pipe shaft ends connected to said nipple connector, wherein said pipe shaft is supported at said base in lieu of being supported solely from said gear motor.

5. The indexing valve of claim 4, further comprising an access plate removably attached to said bottom bearing mount allowing access to said bearing assembly.

6. The indexing valve of claim 4, further comprising a lower air box defined within said bottom bearing mount.

7. The indexing valve of claim 6, further comprising an air duct extending from said lower air box.

8. The indexing valve of claim 1, further comprising; a plurality of air-flow holes defined within said pipe shaft, all of said air holes confined within said inlet plenum between said diverter plates; and, a plurality of thru-slots defined within said pipe shaft, said thru-slots defined proximate to each of said pipe shaft ends, wherein said thru-slots are oval-shaped and differ in shape from said air-flow holes to allow more air into said diverter assembly, and wherein said thru-slots are defined outside of said inlet plenum.

9. The indexing valve of claim 1, further comprising a keyway formed on said stub shaft corresponding to a notch on said gear motor.

10. The indexing valve of claim 1, further comprising multiple spacer bolts connecting said opposing diverter plates.

11. The indexing valve of claim 1, further comprising one or more lifting lugs attached to said valve housing at a corner of said housing.

* * * * *